United States Patent
Yamamoto et al.

(10) Patent No.: US 7,867,297 B2
(45) Date of Patent: Jan. 11, 2011

(54) REACTOR, FUEL CELL SYSTEM AND ELECTRONIC EQUIPMENT

(75) Inventors: Tadao Yamamoto, Tokyo (JP); Naotomo Miyamoto, Tokyo (JP); Masaharu Shioya, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 1016 days.

(21) Appl. No.: 11/501,652

(22) Filed: Aug. 9, 2006

(65) Prior Publication Data

US 2007/0054164 A1    Mar. 8, 2007

(30) Foreign Application Priority Data

Sep. 8, 2005    (JP) .............................. 2005-260546

(51) Int. Cl.
*B01J 7/00* (2006.01)
*H01M 8/06* (2006.01)
*C01B 3/36* (2006.01)
*C10J 3/46* (2006.01)
*C10J 3/54* (2006.01)
*C01D 7/00* (2006.01)
*B01J 10/00* (2006.01)
*B01J 14/00* (2006.01)
*A62D 3/00* (2007.01)

(52) U.S. Cl. ...................... 48/61; 48/197 R; 423/423; 422/129; 422/199

(58) Field of Classification Search ............. 48/61, 48/127.9; 423/423; 422/129, 199
See application file for complete search history.

(56) References Cited

U.S. PATENT DOCUMENTS

2006/0263655 A1 * 11/2006  Schaevitz et al. ............. 429/13

FOREIGN PATENT DOCUMENTS

| JP | 2002-356310 A | 12/2002 |
| JP | 2004-075480 A | 3/2004 |
| JP | 2004-331434 A | 11/2004 |
| KR | 2003-0044346 A | 6/2003 |

OTHER PUBLICATIONS

Machine Translation of JP-2004-331434 A (Oct. 27, 2009).*
Japanese Office Action (and English translation thereof) dated Sep. 9, 2008, issued in a counterpart Japanese Application.

* cited by examiner

*Primary Examiner*—Alexa D Neckel
*Assistant Examiner*—Matthew J Merkling
(74) *Attorney, Agent, or Firm*—Holtz, Holtz, Goodman & Chick, PC

(57) ABSTRACT

A reactor comprising, a low-temperature reaction part which causes reaction of a reactant, a high-temperature reaction part which causes reaction of the reactant at higher temperature than that of the low-temperature reaction part, a high-temperature reaction part heating element which heats high-temperature reaction part, and a wire which is connected to the high-temperature reaction part heating element and is wired to the low-temperature reaction part.

13 Claims, 18 Drawing Sheets

REACTOR, FUEL CELL SYSTEM AND ELECTRONIC EQUIPMENT

BACKGROUND OF THE INVENTION

1. Field of the Invention

The present invention relates to a reactor for reforming a liquid fuel, specifically to a reactor for generating hydrogen to be supplied to a fuel cell, and also related to a fuel cell system and an electronic equipment.

2. Description of Related Art

Recently, a fuel cell has been applied to vehicles, portable equipment and the like as a clean power supply with high energy conversion efficiency. The fuel cell is to allow a fuel to electrochemically react with oxygen for directly extracting electric energy from chemical energy.

As a starting fuel used for the fuel cell, for example, hydrogen is applied, and there is a problem in handling hydrogen because simple substance of hydrogen is gas at normal temperature and normal pressure. Although there has been an attempt to store hydrogen with a hydrogen absorbing alloy, the storage amount of hydrogen per unit volume has been small and insufficient especially as a fuel storage unit for a power supply of compact electronic equipment such as portable electronic equipment. On the other hand, a system which employs a liquid fuel having hydrogen atoms such as alcohols as a starting fuel, generates a reformed gas containing hydrogen gas by reforming the liquid fuel, and feeds the hydrogen into the fuel cell has been developed.

The system may comprise, mainly, a "reformer" for bringing the liquid fuel into reforming reaction and "carbon monoxide remover" for removing a by-product (carbon monoxide) produced by the reforming reaction (e.g., see JP 2002-356310A).

However, in the above reactor, the proper operation temperature range of the carbon monoxide remover is lower than the proper operation temperature range of the hydrogen reformer, and temperature environments for proper operation are different between the reformer and the carbon monoxide remover. In order to heat the reformer and the carbon monoxide remover to the appropriate temperature, respectively, it is conceivable that, for example, a lead wire is connected to an electric resistance heating element and electric power is supplied from the outside through the lead wire. However, the heat generated in the electric resistance heating element leaks to outside in not a small amount and heat loss is caused.

A purpose of the present invention is to provide a reactor having a part in which reaction occurs at high temperature and a part in which reaction occurs at low temperature and capable of suppressing heat leakage to the outside, and to provide a fuel cell system and an electronic equipment comprising the reactor.

SUMMARY OF THE INVENTION

According to a first aspect of the invention, a reactor comprises: a low-temperature reaction part which causes reaction of a reactant; a high-temperature reaction part which causes reaction of the reactant at higher temperature than that of the low-temperature reaction part; a high-temperature reaction part heating element which heats the high-temperature reaction part; and a wire which is connected to the high-temperature reaction part heating element and is wired to the low-temperature reaction part.

There is a possibility that the heat generated in the high-temperature reaction part leaks to an outside of the reactor because of the heat conduction by the wire. However, according to the present invention, heat exchange with the wire occurs to heat the low-temperature reaction part and to cool the high-temperature reaction part because the wire is wired to the low-temperature reaction part and is not wired to the outside directly, and thereby, the amount of heat that leaks to the outside can be suppressed and heat loss of the reactor can be suppressed.

Preferably, the reactor further comprises a connecting pipe spanned between the high-temperature reaction part and the low-temperature reaction part to transport a reactant and a product between the high-temperature reaction part and the low-temperature reaction part, wherein the wire is wired to the connecting pipe.

According to the present invention, the wire also conducts the heat to the connecting pipe as well, and the reactant and product circulating in the connecting pipe can be prevented from being exposed to the drastic fluctuations of the temperature environment. Further, the wire can be easily and continuously wired from the high-temperature reaction part to the low-temperature reaction part through the connecting pipe between them.

Preferably, respective bottom faces of the high-temperature reaction part, the low-temperature reaction part and the connecting pipe are in a same plane.

According to the present invention, since respective bottom faces of the high-temperature reaction part, the low-temperature reaction part and the connecting pipe are in a same plane, a member across the respective bottom faces can be easily installed in a simple manufacturing process.

Preferably, an insulating film is formed on the high-temperature reaction part and the high-temperature reaction part heating element is provided on the insulating film.

According to the present invention, since the insulating film is formed on the high-temperature reaction part and the high-temperature reaction part heating element is provided thereon, when the surface of the high-temperature reaction part is a conductor such as metal, the voltage applied to the high-temperature reaction part heating element is not divided to the high-temperature reaction part, and thereby, the high-temperature reaction part heating element can heat the high-temperature reaction part to desired temperature.

Preferably, the reactor comprises a lead wire for high-temperature reaction part connected to the high-temperature reaction part heating element through the wire to apply a voltage to the high-temperature reaction part heating element from outside.

According to the present invention, since the wire wired to the low-temperature reaction part is connected to the lead wire for high-temperature reaction part, electric connection to the outside can be made easily.

Preferably, the high-temperature reaction part heating element functions as a temperature sensor.

According to the present invention, since the high-temperature reaction part heating element functions as a temperature sensor, the high-temperature reaction part can be temperature-controlled without a temperature sensor separately provided in the high-temperature reaction part, and further, the number of parts and the manufacturing cost can be suppressed.

Preferably, the reactor further comprises a heat insulating package to house the low-temperature reaction part, the high-temperature reaction part, the high-temperature reaction part heating element, and the wire.

According to the present invention, since the heat insulating package houses even the high-temperature reaction part heating element, the high-temperature reaction part heating element is hard to loose heat.

Preferably, the reactor further comprises: a heat insulating package to house the low-temperature reaction part, the high-temperature reaction part, the high-temperature reaction part heating element, and the wire; and a lead wire for high-temperature reaction part connected to the high-temperature reaction part heating element through the wire and exposed from the insulating package to apply a voltage to the high-temperature reaction part heating element from outside.

According to the present invention, the radiation of the high-temperature reaction part is shut in the heat insulating package Preferably, the lead wire for high-temperature reaction part is provided in the low-temperature reaction part.

Preferably, the reactor further comprises: a low-temperature reaction part heating element provided in the low-temperature reaction part; and a lead wire for low-temperature reaction part connected to the low-temperature reaction part heating element to apply a voltage to the low-temperature reaction part heating element from outside.

Preferably, the reactor further comprises: a heat insulating package to house the low-temperature reaction part, the high-temperature reaction part, the high-temperature reaction part heating element, and the wire; a lead wire for high-temperature reaction part connected to the high-temperature reaction part heating element through the wire and exposed from the insulating package to apply a voltage to the high-temperature reaction part heating element from outside; a low-temperature reaction part heating element provided in the low-temperature reaction part; and a lead wire for low-temperature reaction part connected to the low-temperature reaction part heating element and exposed from the insulating package to apply a voltage to the low-temperature reaction part heating element from outside.

Preferably, the lead wire for high-temperature reaction part and the lead wire for low-temperature reaction part are provided in the low-temperature reaction part.

Preferably, the low-temperature reaction part comprises a carbon monoxide remover.

Preferably, the high-temperature reaction part comprises a reformer to reform a fuel containing a hydrogen atom in a chemical composition of the fuel so as to generate a hydrogen.

Preferably, the low-temperature reaction part is mainly composed of a metal material.

Preferably, the high-temperature reaction part is mainly composed of a metal material.

According to a second aspect of the invention a fuel cell system comprises the reactor of the first aspect.

According to a third aspect of the invention, an electronic equipment operates by using the fuel cell system of the second aspect.

There is a possibility that the heat generated in the high-temperature reaction part heating element for heating the high-temperature reaction part leaks too much to the outside via the high-temperature reaction part heating element because the heating element for high-temperature reaction part is connected to the outside so as to be supplied with a voltage from the outside. However, according to the present invention, heat exchange occurs to heat the low-temperature reaction part and to cool the high-temperature reaction part itself because the heating element for high-temperature reaction part is wired to the low-temperature reaction part, and thereby, the amount of heat that leaks to the outside can be suppressed.

DETAILED DESCRIPTION OF PREFERRED EMBODIMENTS

Hereinafter, a preferred embodiment of the present invention will be described using the drawings. Although the following embodiment includes various technically preferable limitations for implementation of a fuel cell system of the invention, the scope of the invention is not limited to the embodiment or examples illustrated as below.

Figure 1:
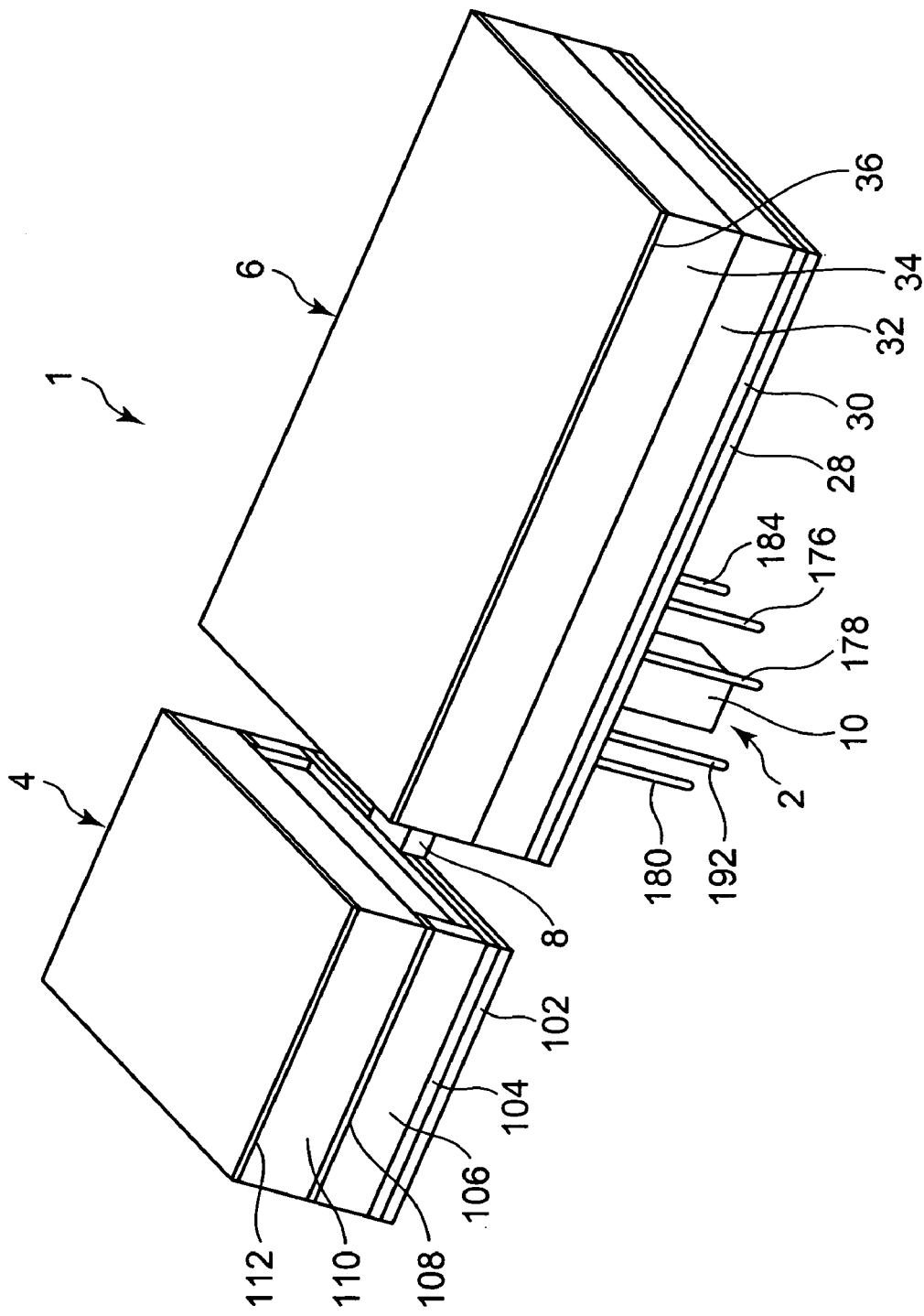
FIG. 1 is a perspective view of a microreactor module 1 shown from diagonally above.
Figure 2:
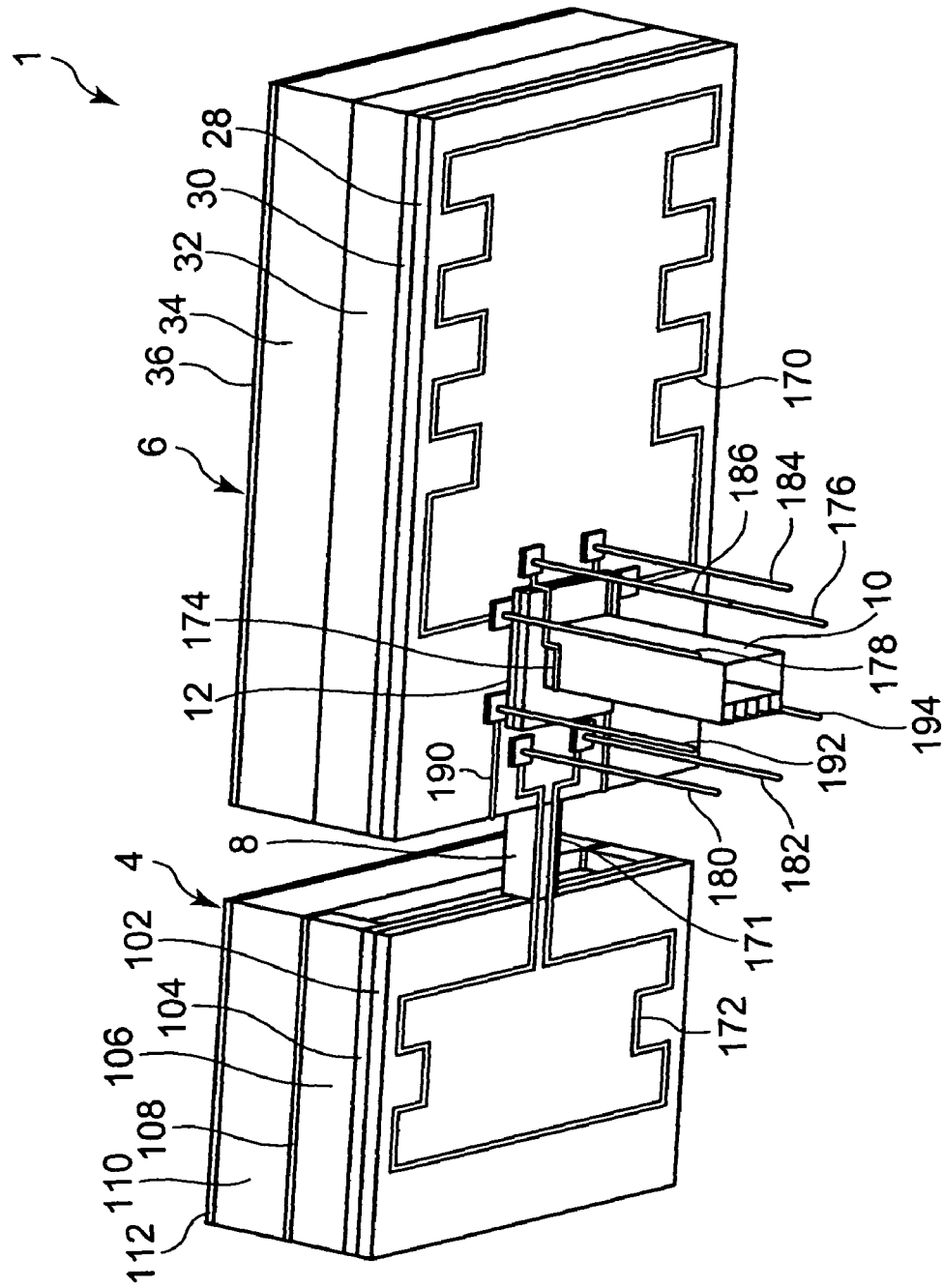
FIG. 2 is a perspective view of the microreactor module 1 shown from diagonally below.
Figure 3:
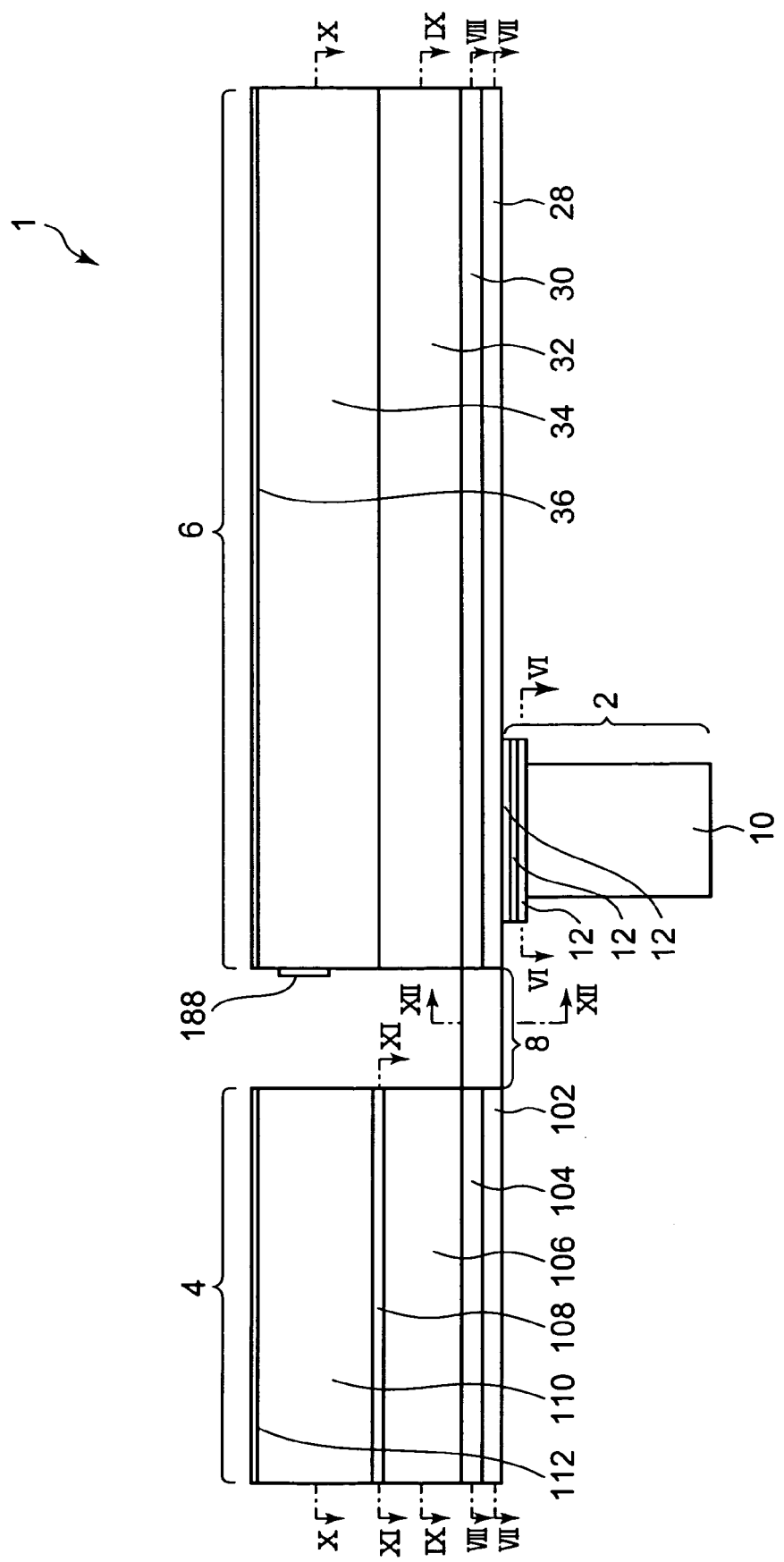
FIG. 3 is a side view of the microreactor module 1.

FIG. 1 is a perspective view of a microreactor module 1 shown from diagonally above, FIG. 2 is a perspective view of the microreactor module 1 shown from diagonally below, and FIG. 3 is a side view of the microreactor module 1.

The microreactor module 1 is a reactor for generating a hydrogen gas used for a fuel cell, built into an electronic equipment such as a notebook personal computer, PDA, electronic organizer, digital camera, cellular phone, wrist watch, register, and projector, along with a fuel cell for generating electric power for the electronic equipment. The microreactor module 1 includes a supply and discharge part 2 in which reactants (material) are supplied and products formed from the reactants are discharged, a high-temperature reaction part 4 in which a reforming reaction occurs at high temperature relative to the appropriate reaction temperature range in a low-temperature reaction part 6, the low-temperature reaction part 6 in which a selective oxidation reaction occurs at low temperature relative to the appropriate reaction temperature range in the high-temperature reaction part 4, a connecting pipe 8 for flowing in or flowing out the reactants and products between the high-temperature reaction part 4 and the low-temperature reaction part 6.

Figure 4:
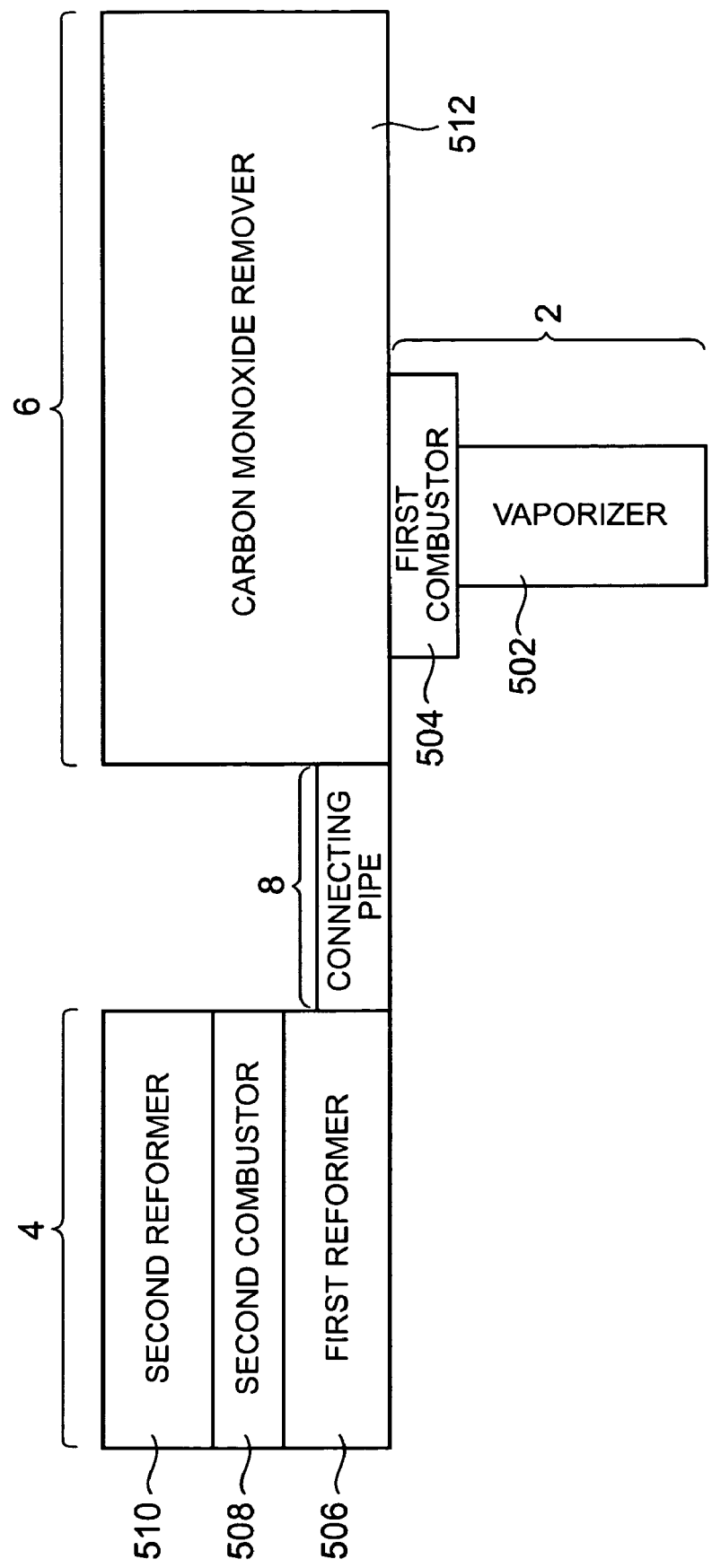
FIG. 4 is a schematic side view when the microreactor module 1 is divided with respect to each function.

FIG. 4 is a schematic side view where the microreactor module 1 is divided with respect to each function. As shown in FIG. 4, the supply and discharge part 2 is mainly provided with a vaporizer 502 and a first combustor 504. To the first combustor 504, a fuel vaporized at least in part (e.g., hydrogen gas, methanol gas, or the like) and a gas as an oxygen source such as air containing oxygen for combusting the fuel are supplied separately or as gas mixture, and these gases are combusted because of a catalyst within the first combustor 504 and generate heat. To the vaporizer 502, water and a liquid fuel (e.g., alcohols such as methanol and ethanol, ethers such as dimetyl ether, and fuels including a hydrogen atom in the composition thereof such as gasoline) are supplied separately or as mixture from a fuel container, and the water and the liquid fuel are vaporized within the vaporizer 502 by the combustion heat in the first combustor 504 conducted into the vaporizer 502.

The high-temperature reaction part 4 is provided with a first reformer 506, a second combustor 508, and a second reformer 510. The first reformer 506 and the second reformer 510 are reformers that reform fuels to generate hydrogen gas, and have structures in communication with each other. The first reformer 506 is located at the lower side and the second reformer 510 is located at the upper side, and the second combustor 508 is sandwiched between the first reformer 506 and the second reformer 510, in which the upper and lower surfaces of the second combustor 508 contact with the lower surface of the second reformer 510 and the upper surface of the first reformer 506 respectively.

To the second combustor 508, a fuel vaporized at least in part (e.g., hydrogen gas, methanol gas, or the like) and a gas as an oxygen source such as air containing oxygen are supplied separately or as mixture, and these gases are combusted because of a catalyst within the second combustor 508 and generate heat. In the following fuel cell, unreacted hydrogen gas is sometimes contained in the offgas discharged from the fuel cell after an electrochemical reaction occurs by the supplied hydrogen gas. At least one of the first combustor 504 and the second combustor 508 may mix and combust the unreacted hydrogen gas with oxygen or a gas such as air containing oxygen so as to generate heat. Regardless to add, at least one of the first combustor 504 and the second combustor 508 may vaporize the liquid fuel (e.g., methanol, ethanol, butane, dimetyl ether, or gasoline) stored in the fuel container with another vaporizer and combust the vaporized fuel with oxygen or a gas such as air containing oxygen.

In the case where the second combustor 508 combusts the offgas discharged from the fuel cell, first, at the activation, the first reformer 506 and the second reformer 510 are heated by an after-mentioned heating element 172, so as to generate hydrogen. When the hydrogen is supplied to a fuel cell and the offgas containing hydrogen is constantly discharged from the fuel cell, the second combustor 508 combusts the hydrogen in the offgas and heats the first reformer 506 and the second reformer 510. When the temperature of the second combustor 508 is raised and the first reformer 506 and second reformer 510 are within a proper temperature range for reform so that the second combustor 508 works as a main heat source, application of the voltage to the heating element is reduced or stopped so that the heating element 172 is switched to a auxiliary heat source or is not used as a heat source. In the heated first reformer 506 and the second reformer 510, a hydrogen gas and the like are generated by catalytic reaction from water and a fuel, and a carbon monoxide gas is further generated even though in a small amount. When the fuel is methanol, chemical reactions as in the following formulas (1), (2) occur. The reaction in which hydrogen is generated is an endothermic reaction, and the combustion heat of the second combustor 508 is used.

$$CH_3OH + H_2O \rightarrow 3H_2 + CO_2 \qquad (1)$$

$$H_2 + CO_2 \rightarrow H_2O + CO \qquad (2)$$

The low-temperature reaction part 6 is mainly provided with a carbon monoxide remover 512. To the carbon monoxide remover 512, in a condition that the remover is heated by the first combustor 504, gas mixture containing hydrogen gas, carbon monoxide gas and the like is supplied from the first reformer 506 and the second reformer 510, and air is further supplied. In the carbon monoxide remover 512, a chemical reaction of the following formula (3) occurs so that carbon monoxide is selectively oxidized among the gas mixture, and thereby, carbon monoxide is removed. The hydrogen of the gas mixture (hydrogen-rich gas) from which carbon monoxide has been removed is supplied to a fuel electrode of the fuel cell.

$$2CO + O_2 \rightarrow 2CO_2 \qquad (3)$$

Figure 5:
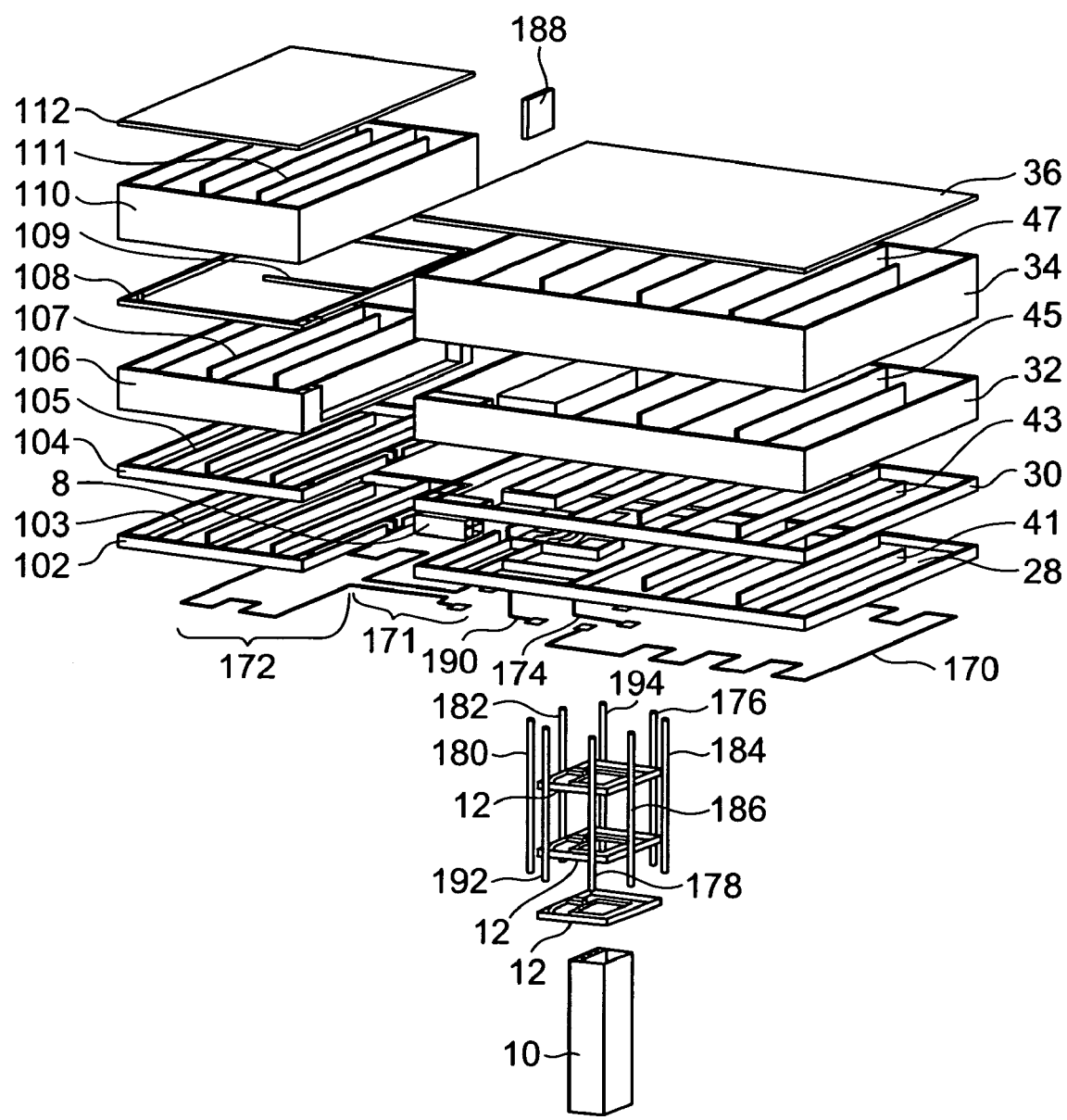
FIG. 5 is an exploded perspective view of the microreactor module 1.
Figure 6A:
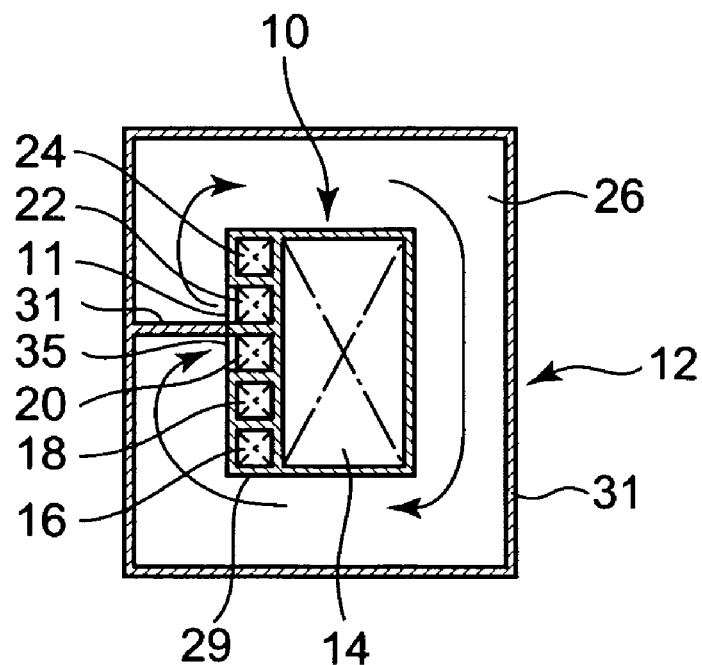
FIGS. 6A and 6B are sectional views in the direction of arrows in a plane along section line VI-VI in FIG. 3.
Figure 6B:
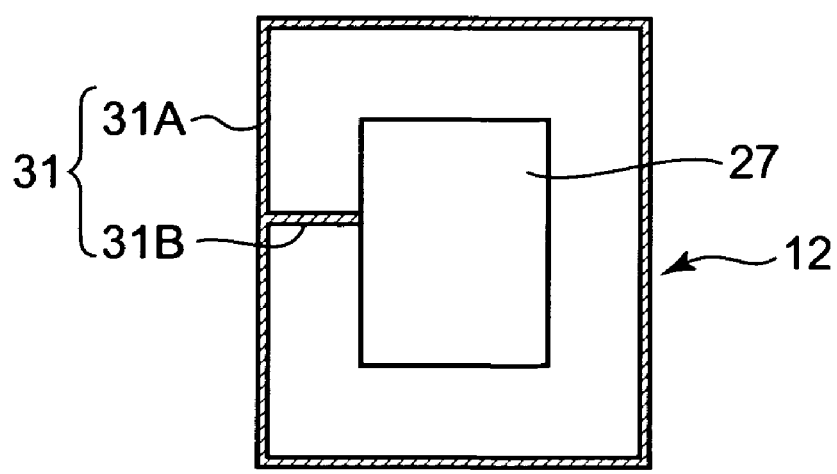
Figure 7:
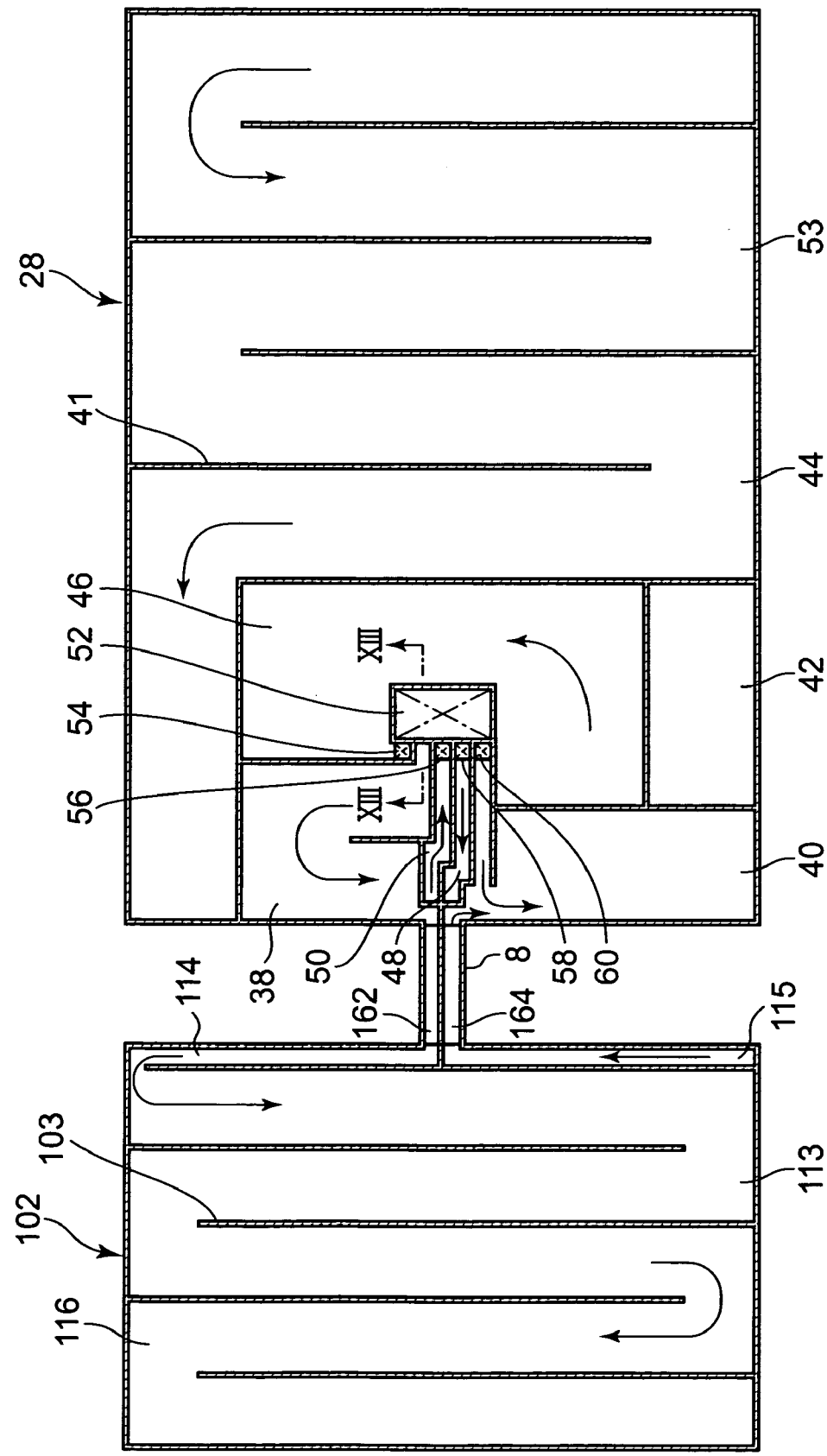
FIG. 7 is a sectional view in the direction of. arrows in a plane along section line VII-VII in FIG. 3.
Figure 8:
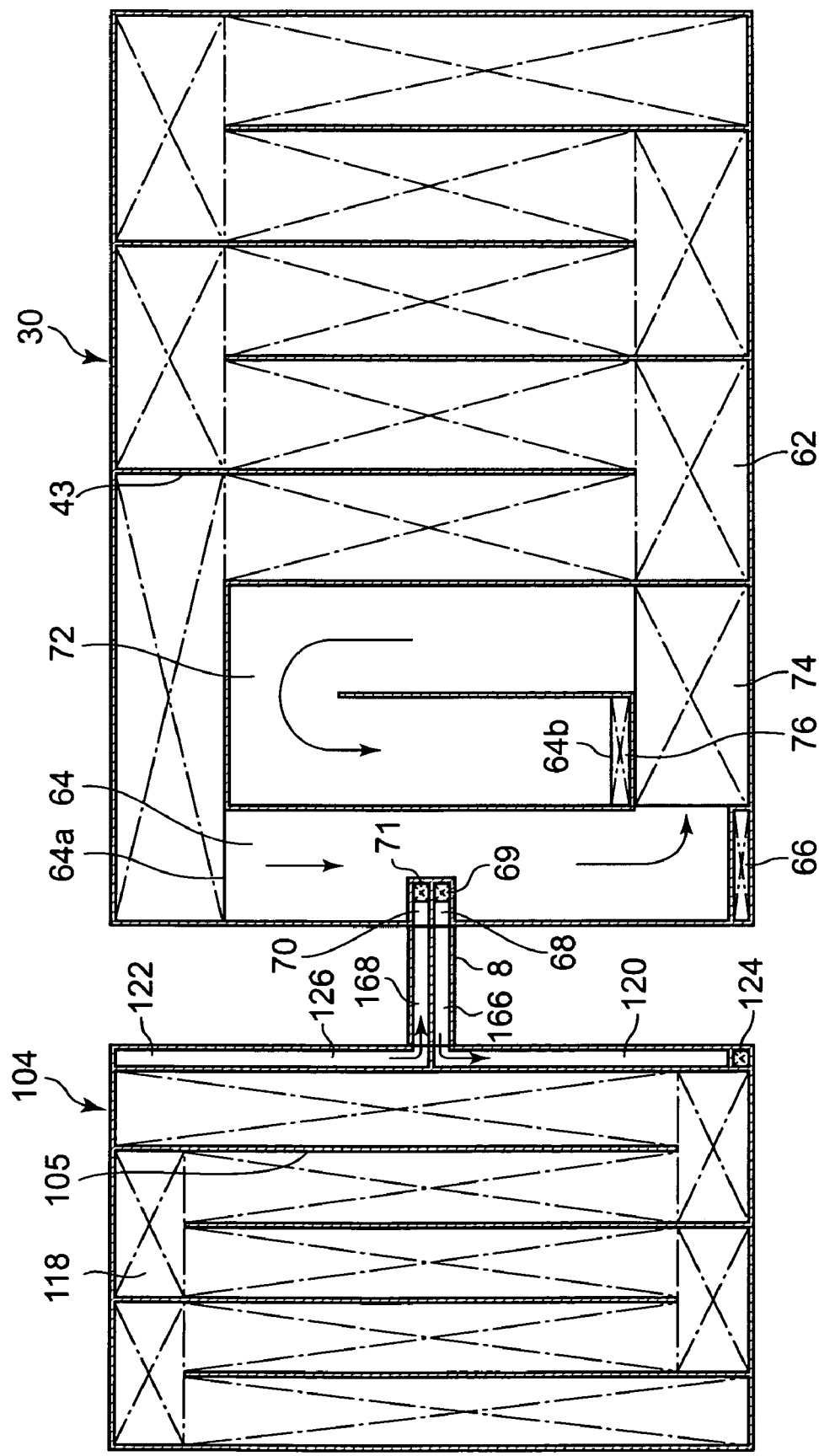
FIG. 8 is a sectional view in the direction of arrows in a plane along section line VIII-VIII in FIG. 3.
Figure 9:
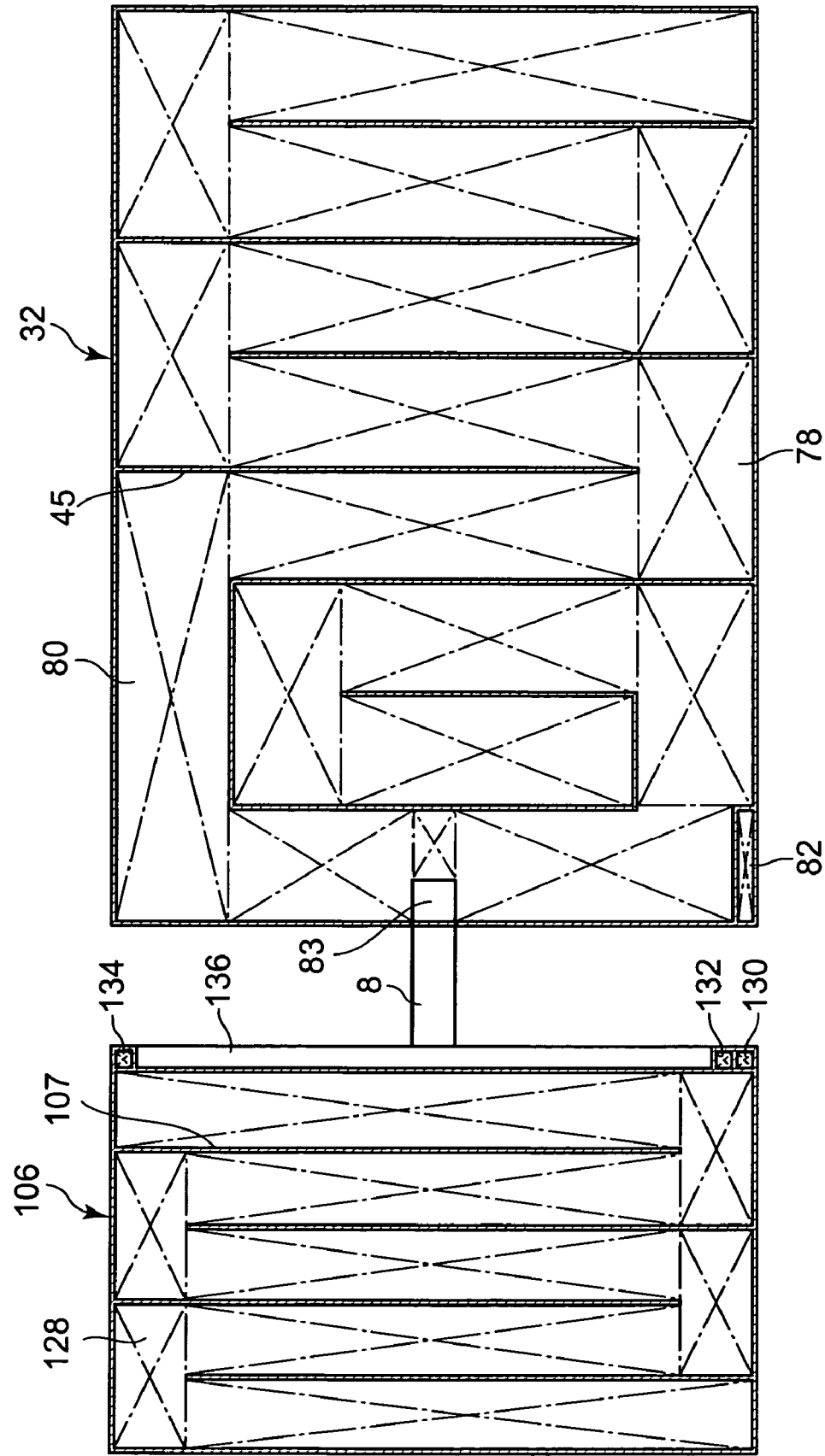
FIG. 9 is a sectional view in the direction of arrows in a plane along section line IX-IX in FIG. 3.
Figure 10:
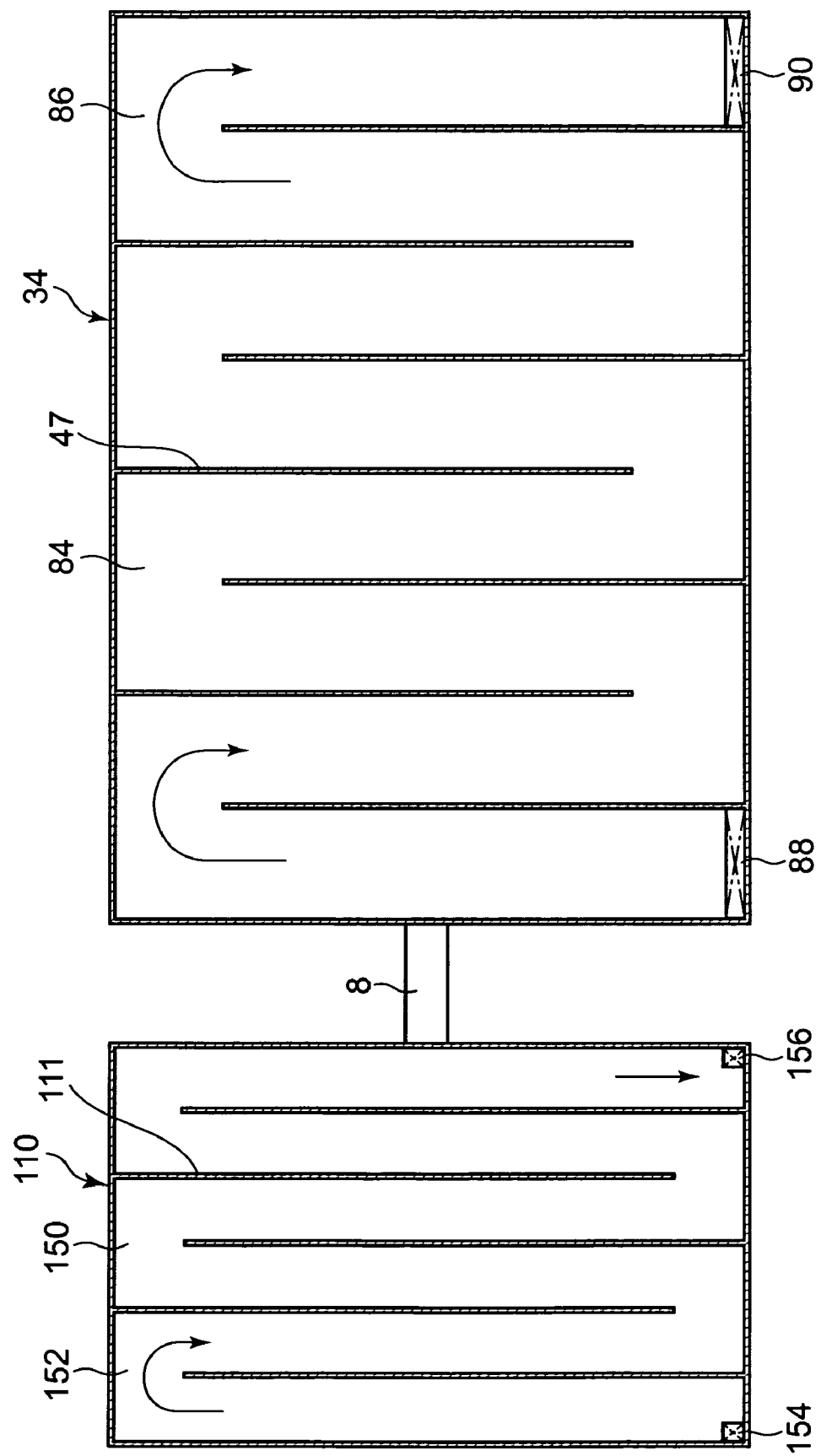
FIG. 10 is a sectional view in the direction of arrows in a plane along section line X-X in FIG. 3.
Figure 11:
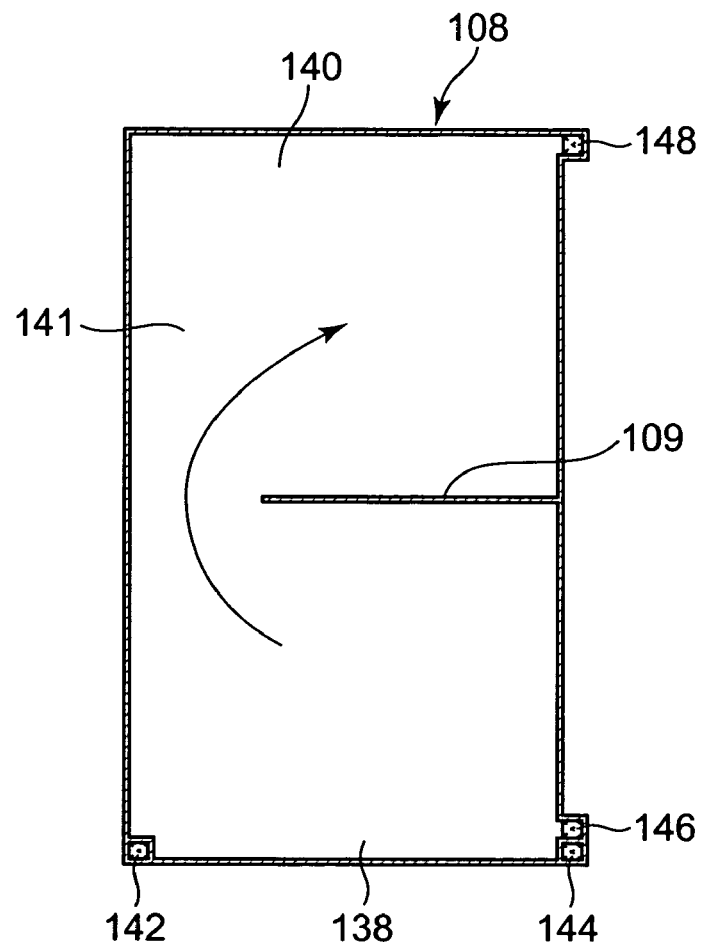
FIG. 11 is a sectional view in the direction of arrows in a plane along section line XI-XI in FIG. 3.
Figure 12:
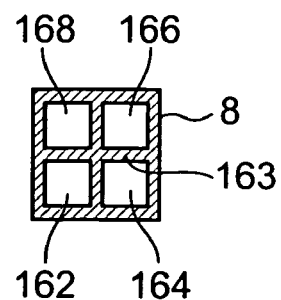
FIG. 12 is a sectional view in the direction of arrows in a plane along section line XII-XII in FIG. 3.
Figure 13:
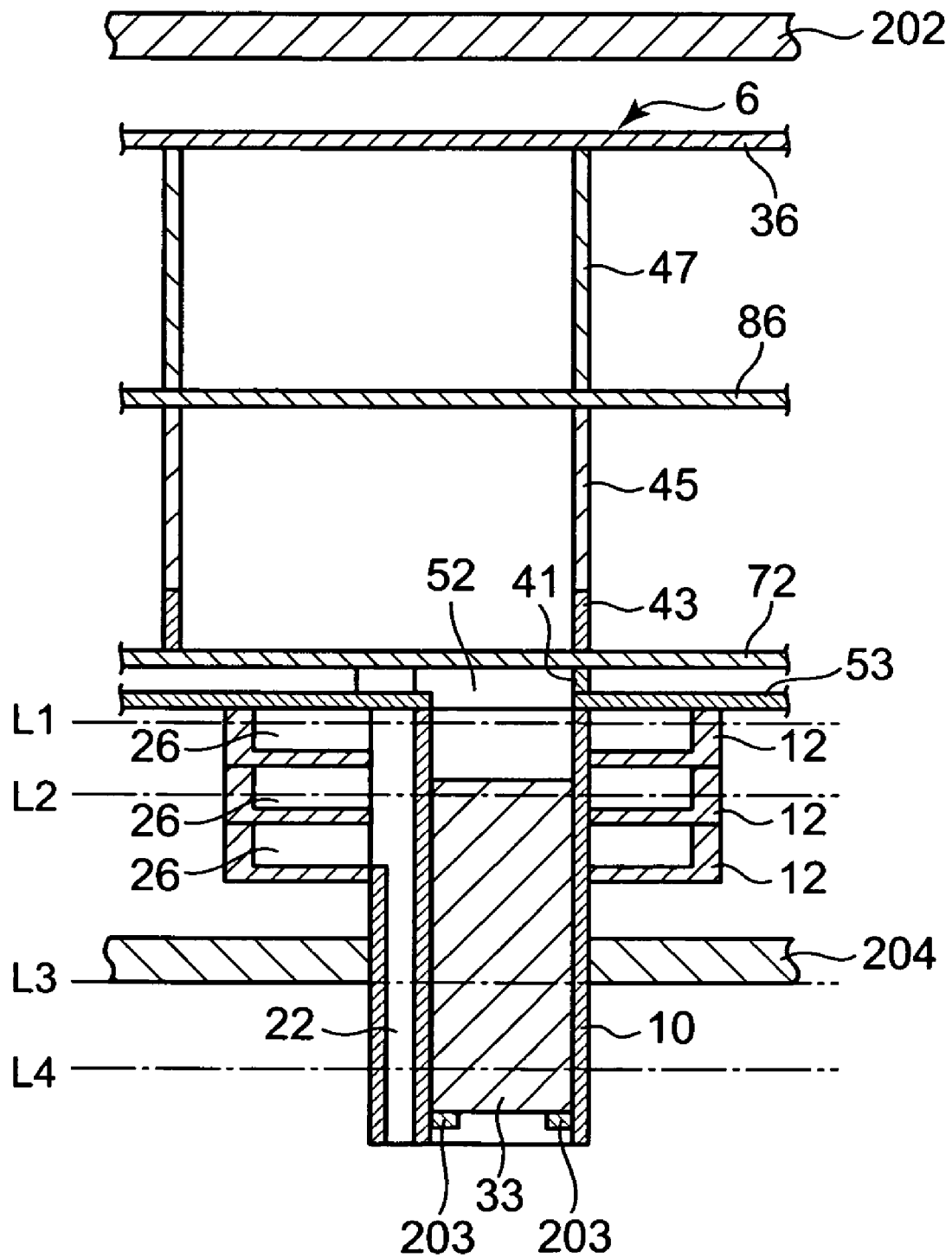
FIG. 13 is a sectional view in the direction of arrows in a plane along section line XIII-XIII in FIG. 7.

Hereinafter, specific configurations of the high-temperature reaction part 4, the low-temperature reaction part 6, and the connecting pipe 8 will be described using FIGS. 3 and 5 to 12. Here, FIG. 5 is an exploded perspective view of the microreactor module 1, FIGS. 6A and 6B are sectional views in the direction of arrows taken along a direction of a plane of a combustor plate 12, which will be described later, from section line VI-VI in FIG. 3 in conditions that there is an external circulation pipe 10 or not, respectively. FIG. 7 is a sectional view in the direction of arrows taken along a direction of a plane of a base plate 28 and a base plate 102, which will be described later, from section line VII-VII in FIG. 3. FIG. 8 is a sectional view in the direction of arrows taken along a direction of a plane of a lower frame 30 and a lower frame 104, which will be described later, from section line VIII-VIII in FIG. 3. FIG. 9 is a sectional view in the direction of arrows taken along a direction of a plane of a middle frame 32 and a middle frame 106, which will be described later, from section line IX-IX in FIG. 3. FIG. 10 is a sectional view in the direction of arrows taken along a direction of a plane of an upper frame 34 and an upper frame 110, which will be described later, from section line X-X in FIG. 3. FIG. 11 is a sectional view in the direction of arrows taken along a direction of a plane of a combustor plate 108, which will be described later, from section line XI-XI in FIG. 3. FIG. 12 is a sectional view in the direction of arrows taken along a direction of a plane perpendicular to the communication direction of the connecting pipe 8 from section line XII-XII in FIG. 3. FIG. 13 is a sectional view in the direction of arrows taken along a thickness direction of the low-temperature reaction part 6 from section line XIII-XIII in FIG. 7.

As shown in FIGS. 3, 5 and 6, the supply and discharge part 2 has flexibility to thermal expansion, and includes an external circulation pipe 10 of a metal material such as stainless steel (SUS304) advantageous in thermal conductivity and corrosion resistance and three combustion plates 12 stacked around the external circulation pipe 10. The combustion plates 12 are jointed to the external circulation pipe 10 by brazing. As a brazing material, preferable is a material having a melting point higher than the maximum temperature of the fluids flowing in the external circulation pipe 10 and the combustion plates 12 in reforming a fuel in the microreactor module 1, and also preferable is a material having a melting point of 700° C. or more which is 300° C. or more higher than the maximum temperature. Specifically, a gold solder containing silver, copper, zinc, and cadmium in gold, a solder principally consisting of gold, silver, zinc, and nickel, or a solder principally consisting of gold, palladium, and silver is especially preferable.

The external circulation pipe 10 is a pipe having plural channels circulating the respective fluids within the microreactor module 1 to the outside of the microreactor module 1, and the external circulation pipe 10 is provided with an introduction channel for vaporization 14, an air introduction channel 16, a combustion mixture introduction channel 18, an exhaust gas discharge channel 20, a combustion mixture introduction channel 22, and a hydrogen gas discharge channel 24 in parallel with one another. Partition walls 29 of the external circulation pipe 10 partition the introduction channel for vaporization 14, the air introduction channel 16, the combustion mixture introduction channel 18, the exhaust gas discharge channel 20, the combustion mixture introduction channel 22, and the hydrogen gas discharge channel 24. An inlet opening 11 and an outlet opening 35 respectively to the combustion mixture introduction channel 22 and exhaust gas discharge channel 20 are provided on the partition walls 29 at a position contacting with the combustor plate 12. Although the introduction channel for vaporization 14, the air introduction channel 16, the combustion mixture introduction channel 18, the exhaust gas discharge channel 20, the combustion mixture introduction channel 22, and the hydrogen gas discharge channel 24 are provided in one external circulation pipe 10, these channels 14, 16, 18, 20, 22, 24 may be provided in separate tube materials and the external circulation pipe 10 may be formed by bundling the tube materials together. The hydrogen gas discharge channel 24 of the external circulation pipe 10 is coupled to the fuel electrode of a power generation module 608, which will be described later, and the introduction channel for vaporization 14 of the external circulation pipe 10 is coupled to a fuel container 604 via a flow rate control unit 606, which will be described later.

The introduction channel for vaporization 14 is filled with a liquid absorbing material 33 such as a felt material, ceramic porous material, fiber material, and carbon porous material. The liquid absorbing material 33 is to absorb liquid fuel and water, and may be a material formed by hardening inorganic fiber or organic fiber with a binder, a material formed by sintering inorganic powder, a material formed by hardening inorganic powder with a binder, or mixture of graphite and glassy carbon.

The combustor plate 12 is also made of a metal material such as stainless steel (SUS304) advantageous in corrosion resistance. A through hole 27 is formed at the center of the combustor plate 12, and the external circulation pipe 10 is fitted in the through hole 27 for joining the external circulation pipe 10 and the combustor plate 12. Further, a partition wall 31 is provided so as to project on one face of the combustor plate 12. An outer part 31A of the partition wall 31 is provided over the entire circumference of the outer rim of the combustor plate 12, an partitioning part 31B of the partition wall 31 is provided across the radial direction from an inner surface of the outer part 31A to the through hole 27. The upper surface of the outer part 31A and the upper surface of the partitioning part 31B of the lower combustor plate 12 are respectively blazed with the lower surface of the upper combustor plate 12 respectively at positions of the outer rim thereof and between the exhaust gas discharge channel 20 and combustion mixture introduction channel 22. When the three combustor plates 12 are stacked with leaving no space between around the external circulation pipe 10 and the partition wall of the uppermost combustor plate 12 is joined to the lower face of the low-temperature reaction part 6, the joined faces form a combustion channel. One end of the combustion channel 26 leads to the combustion mixture introduction channel 22 through the inlet opening 11 and the other end of the combustion channel 26 leads to the exhaust gas discharge channel 20 through the outlet opening 35. On the wall of the combustion plate 12 which forms the combustion channel 26, a combustion catalyst for combusting the combustion mixture lead to the combustion channel 26 is supported. As the combustion catalyst, platinum or the like can be given.

As shown in FIG. 13, a ring-shaped support 203 is provided inside the external circulation pipe 10, in which the outer periphery of the support 203 is jointed with the inner periphery of the external circulation pipe 10. The external circulation pipe 10 is filled with the liquid absorbing material 33 up to the location of the combustor plate 12, and the support 203 supports the liquid absorbing material 33 by placing the inferior part thereof on the support 203.

As shown in FIGS. 3 and 5, the low-temperature reaction part 6 is formed by stacking the base plate 28, the lower frame 30, the middle frame 32, the upper frame 34, and a lid plate 36 in this order from the bottom and takes a rectangular parallelepiped shape. The base plate 28, the lower frame 30, the middle frame 32, the upper frame 34, and the lid plate 36 are made of a metal material such as stainless steel (SUS304) advantageous in corrosion resistance.

The base plate 28 comprises a planer bottom plate 53 across the whole area of the low-temperature reaction part 6. At the center in the width direction of the base plate 28, the external circulation pipe 10 and the combustor plate 12 locating the uppermost position are joined to the lower face of the base plate 28. As shown in FIG. 7, since a partition wall 41 is provided so as to project on the upper face of the base plate 28 (i.e. upper side of the bottom plate 53) with a predetermined shape, the channel is divided into a gas mixture channel 38, a mixing channel 40, a channel for removing carbon monoxide 42, a zigzag channel for removing carbon monoxide 44, a U-shaped channel for removing carbon monoxide 46, a combustion mixture channel 48, and an exhaust gas channel 50. A through hole 52 is formed on the bottom plate 53 at the end of the gas mixture channel 38, and the gas mixture channel 38 leads to the introduction channel for vaporization 14 of the external circulation pipe 10 via the through hole 52. The channel for removing carbon monoxide 46 surrounds the through hole 52, and a through hole 54 is formed on the bottom plate 53 at the end of the channel for removing carbon monoxide 46 and the channel for removing carbon monoxide 46 leads to the hydrogen gas discharge channel 24 via the through hole 54. A through hole 58 is formed on the bottom plate 53 at the end of the combustion mixture channel 48 and the combustion mixture channel 48 leads to the combustion mixture introduction channel 18 via the through hole 58. A through hole 56 is formed on the bottom plate 53 at the end of the exhaust gas channel 50 and the exhaust gas channel 50 leads to the exhaust gas discharge channel 20 via the through hole 56. A through hole 60 is formed on the bottom plate 53 at the end of the mixing channel 40 and the mixing channel 40 leads to the air introduction channel 16 via the through hole 60. The bottom plate 53 seals the position corresponding to the combustion mixture introduction channel 22.

As shown in FIG. 8, since a partition wall 43 is provided inside of the lower frame 30, the interior of the lower frame 30 is divided into a zigzag channel for removing carbon monoxide 62, a spiral channel for removing carbon monoxide 64, a well hole 66, a combustion mixture channel 68, and an exhaust gas channel 70. A bottom plate 72 is provided in the channel for removing carbon monoxide 64, the combustion mixture channel 68, and the exhaust gas channel 70 in the state that the bottom plate 72 is located over the bottom plate 53 with a clearance therebetween. When the lower frame 30 is joined to the base plate 28 by brazing or the like, the upper part of the gas mixture channel 38, the mixing channel 40, the channel for removing carbon monoxide 46, the combustion mixture channel 48, and the exhaust gas channel 50 is covered by the bottom plate 72. Further, one end 64a of the channel for removing carbon monoxide 64 leads to the channel for removing carbon monoxide 62, a well hole 74 which leads to the channel for removing carbon monoxide 42 of the base plate 28 is formed in the middle of the channel for removing carbon monoxide 64, and a well hole 76 which leads to the exhaust gas channel 50 of the base plate 28 is formed at the other end 64b of the channel for removing carbon monoxide 64. The partition wall 43 overlaps with the partition wall 41 so that the channel for removing carbon monoxide 62 may be aligned with the channel for removing carbon monoxide 44 of the base plate 28 in the plan view, and the channel for removing carbon monoxide 44 and the channel for removing carbon monoxide 62 form a well. The well hole 66 is located above the mixing channel 40 of the base plate 28. A well hole 69 is formed in the combustion mixture channel 68 and the combustion mixture channel 68 leads to the combustion mixture channel 48 of the base plate 28 via the well hole 69. A well hole 71 is formed in the exhaust gas channel 70 and the exhaust gas channel 70 leads to the exhaust gas channel 50 of the base plate 28 via the well hole 71.

In the plan view, the external circulation pipe 10 overlaps with part of the channel for removing carbon monoxide 64, and the channel for removing carbon monoxide 64 has a spiral structure around the external circulation pipe 10. By doing so, the vaporizer 502 is heated due to the heat generated at the combustion plate 12, so that the liquid fuel and water is heated and vaporized. Furthermore, the channel for removing carbon monoxide 64 and the vicinity thereof can be also heated in order to cause the reaction of the above formula (3) at the channel for removing carbon monoxide 64.

As shown in FIG. 9, since a partition wall 45 is provided inside of the middle frame 32, the interior of the middle frame 32 is divided into a zigzag channel for removing carbon monoxide 78, a spiral channel for removing carbon monoxide 80, and a well hole 82. A bottom plate 83 is provided in part of the channel for removing carbon monoxide 80. When the middle frame 32 is joined to the lower frame 30 by brazing or the like, the upper part of the combustion mixture channel 68 and the exhaust gas channel 70 of the lower frame 30 is covered by the bottom plate 83. The partition wall 45 overlaps with the partition wall 43 so that the channel for removing carbon monoxide 78 may be aligned with the channel for removing carbon monoxide 62 of the lower frame 30 in the plan view, and the channel for removing carbon monoxide 62 and the channel for removing carbon monoxide 78 form a well. The partition wall 45 overlaps with the partition wall 43 so that the channel for removing carbon monoxide 80 may be aligned with the channel for removing carbon monoxide 64 of the lower frame 30 in the plan view, and the channel for removing carbon monoxide 64 and the channel for removing carbon monoxide 80 form a well. The well hole 82 overlaps the well hole 66 of the lower frame 30 and the well hole 82 and the well hole 66 are in communication with each other.

As shown in FIG. 10, since a partition wall 47 is provided inside of the upper frame 34, a zigzag channel for removing carbon monoxide 84 is formed inside of the upper frame 34. Further, a bottom plate 86 is provided in the entire interior of the upper frame 34. When the upper frame 34 is joined to the middle frame 32 by brazing or the like, the upper part of the channel for removing carbon monoxide 78 and the channel for removing carbon monoxide 80 of the middle frame is covered by the bottom plate 86. Further, a well hole 88 is formed at one end of the channel for removing carbon monoxide 84 and a well hole 90 is formed at the other end of the channel for removing carbon monoxide 84. The well hole 88 overlaps the well hole 82 of the middle frame 32, and the channel for removing carbon monoxide 84 leads to the mixing channel 40 via the well hole 88, the well hole 82, and the well hole 66. The well hole 90 is located above the end of the channel for removing carbon monoxide 78 of the middle frame 32 and the channel for removing carbon monoxide 84 leads to the channel for removing carbon monoxide 78 via the well hole 90.

As shown in FIG. 5, since the lid plate 36 is jointed to the upper parts of the upper frame 34 and partition plate 47, the upper part of the channel for removing carbon monoxide 84 is covered by the lid plate 36. Here, catalysts for selective oxidization of carbon monoxide for selectively oxidizing carbon monoxide is supported on the entire wall surfaces of the channels for removing carbon monoxide 42, 44, 46, 62, 64, 78, 80, and 84. In the predetermined locations of the base plate 28, the lower frame 30, the middle frame 32, and the channel upper frame 34 as wall surfaces, catalysts for selective oxidization of carbon monoxide are supported in advance before joined to one another. As the catalyst for selective oxidization of carbon monoxide, platinum or the like is cited.

As shown in FIGS. 3 and 5, the high-temperature reaction part 4 is formed by stacking the base plate 102, the lower frame 104, the middle frame 106, the combustor plate 108, the upper frame 110, and the lid plate 112 in this order from the bottom and takes a rectangular parallelepiped shape. The base plate 102, the lower frame 104, the middle frame 106, the combustor plate 108, the upper frame 110, and the lid plate 112 are made of a metal material such as stainless steel (SUS304) advantageous in corrosion resistance.

As shown in FIG. 7, a bottom plate 113 is provided in the base plate 102. Since a partition wall 41 is provided on the upper face of the bottom plate 113 so as to project, the channel is divided into a supply channel 114, a zigzag reforming channel 116, and a discharge channel 115. The supply channel 114 continues to the reforming channel 116, and the discharge channel 115 is separate from the supply channel 114 and the reforming channel 116.

As shown in FIG. 8, since a partition wall 105 is provided inside of the lower frame 104, the interior of the lower frame 104 is divided into a zigzag reforming channel 118, a combustion mixture channel 120, an exhaust gas channel 122, and a well hole 124. A bottom plate 162 is provided in the combustion mixture channel 120 and the exhaust gas channel 122. When the lower frame 104 is joined to the base plate 102, the supply channel 114 and the discharge channel 115 of the base plate 102 are covered by the bottom plate 126. The partition wall 105 overlaps the partition wall 103 so that the reforming channel 118 may be aligned with the reforming channel 116 of the base plate 102 in the plan view, and the reforming channel 118 and the reforming channel 116 form a well.

As shown in FIG. 9, since a partition wall 107 is provided inside of the middle frame 106, the interior of the middle frame 106 is divided into a zigzag reforming channel 128, a well hole 130, a well hole 132, and a well hole 134. A bottom plate 136 is provided in the middle frame 106. When the middle frame 106 is joined to the lower frame 104, the upper part of the combustion mixture channel 120 and the exhaust gas channel 122 of the lower frame 104 are covered by the bottom plate 136. The partition wall 107 overlaps the partition wall 105 so that the reforming channel 128 may be aligned with the reforming channel 118 of the lower frame 104 in the plan view, and the reforming channel 128 and the reforming channel 118 form a well. The well hole 130 overlaps the well hole 124 of the lower frame 104 and the well hole 130 and the well hole 124 form a well. The well hole 132 is located above the end of the combustion mixture channel 120, and the well hole 134 is located above the end of the exhaust gas channel 122.

As shown in FIGS. 3 and 5, since the combustor plate 108 is joined to the upper part of the middle frame 106, the reforming channel 128 of the middle frame 106 is covered by the combustor plate 108. As shown in FIG. 11, a bottom plate 141 is provided in the combustor plate 108. Since a partition wall 109 is provided so as to project on the upper face of the bottom plate 141, the channel is divided into a combustion chamber 138, a combustion chamber 140, a well hole 142, and a well hole 144. A well hole 146 is formed at the end of the combustion chamber 138, the well hole 146 is located above the well hole 132 of the middle frame 106, and the combustion chamber 138 leads to the combustion mixture channel 120 of the lower frame 104 via the well hole 146 and the well hole 132. The combustion chamber 138 leads to the combustion chamber 140. Further, a well hole 148 is formed at the end of the combustion chamber 140, the well hole 148 is located above the well hole 134 of the middle frame 106, and the combustion chamber 140 leads to the exhaust gas channel 122 via the well hole 148 and the well hole 134. The well hole 142 is located above the end of the reforming channel 128 of the middle frame 106 and the well hole 142 leads to the reforming channel 128. The well hole 144 is located above the well hole 130 of the middle frame 106 and the well hole 144 leads to the well hole 130. Catalysts for combustion for combusting the combustion mixture are supported on the wall surfaces of the combustion chamber 138 and the combustion chamber 140. Here, in the predetermined locations of the combustor plate 108 and the upper frame 110 as the wall surfaces, the catalysts for combustion are supported in advance before joined to one another. As the catalyst for combustion, platinum or the like is cited.

As shown in FIG. 10, since a partition wall 111 is provided inside of the upper frame 110, a zigzag reforming channel 150 is formed inside of the upper frame 110. Further, a bottom plate 115 is provided in the upper frame 110. When the upper frame 110 is joined to the upper part of the combustor plate 108 by brazing or the like, the upper part of the combustion chamber 138 and the combustion chamber 140 of the combustor plate 108 is covered. A well hole 154 is formed at one end of the reforming channel 150 and a well hole 156 is formed at the other end of the reforming channel 150. The well hole 154 is located above the well hole 142 of the combustor plate 108, and the reforming channel 150 leads to the reforming channel 128 via the well hole 154 and the well hole 142. The well hole 156 is located above the well hole 144 of the combustor plate 108, and the reforming channel 150 leads to the discharge channel 115 via the well hole 156, the well hole 144, the well hole 130, and the well hole 124.

As shown in FIG. 5, since the lid plate 112 is joined to the upper part of the upper frame 110, the upper part of the reforming channel 150 is covered by the lid plate 112. Here, catalysts for reforming that reforms the fuel and generates hydrogen are supported on the wall surfaces of the supply channel 114, the discharge channel 115, and the reforming channels 116, 118, 128, and 152. Here, in the predetermined locations of the base plate 102, the lower frame 104, the middle frame 106, the combustor plate 108, the upper frame 110, and the lid plate 112 as wall surfaces, catalysts for combustion are supported in advance before joined to one another. As the catalyst used for reforming methanol, Cu/ZnO catalyst, Pt/ZnO catalyst, or the like is cited.

As shown in FIGS. 3 and 4, the outer shape of the connecting pipe 8 takes rectangular column, the width of the connecting pipe 8 is narrower than the width of the high-temperature reaction part 4 and the width of the low-temperature reaction part 6, and the height of the connecting pipe 8 is lower than the heights of the high-temperature reaction part 4 and the low-temperature reaction part 6. The connecting pipe 8 is spanned between the high-temperature reaction part 4 and the low-temperature reaction part 6, and the connecting pipe 8 is joined by brazing or the like to the high-temperature reaction part 4 at the center in the width direction of the high-temperature reaction part 4 and joined by brazing or the like to the low-temperature reaction part 6 at the center in the width direction of the low-temperature reaction part 6.

Further, the lower face of the connecting pipe 8 is flush with the lower face of the high-temperature reaction part 4, i.e., the lower face of the base plate 102 and flush with the lower face of the low-temperature reaction part 6, i.e., the lower face of the base plate 28. That is, since the respective lower faces (bottom faces) of the connecting pipe 8, the high-temperature reaction part 4, and the low-temperature reaction part 6 are in the same plane and there is no steps, when the members across the respective lower faces (the second heating element 172 and the like, which will be described later) are provided, the members can be easily provided in the simple manufacturing process.

As shown in FIGS. 7, 8, and 12, the connecting pipe 8 is provided with a coupling channel 162, a coupling channel 164, a coupling channel 166, and a coupling channel 168 are provided in parallel with one another. The coupling channel 162, the coupling channel 164, the coupling channel 166, and the coupling channel 168 are partitioned by partition walls of the connecting pipe 8. One end of the coupling channel 162 leads to the gas mixture channel 38 and the other end of the coupling channel 162 leads to the supply channel 114. One end of the coupling channel 164 leads to the discharge channel 115 and the other end of the coupling channel 164 leads to the mixing channel 40. One end of the coupling channel 166 leads to the combustion mixture channel 68 and the other end of the coupling channel 166 leads to the combustion mixture channel 120. One end of the coupling channel 168 leads to the exhaust gas channel 122 and the other end of the coupling channel 168 leads to the exhaust gas channel 70.

Although the coupling channels 162, 164, 166, and 168 are provided in one connecting pipe 8, these channels 162, 164, 166, and 168 may be provided in separate tube materials and the tube materials may be bundled together. It is preferable that the connecting pipe 8 is made of the same materials as that of the base plate 28, the lower frame 30, the base plate 102, and the lower frame 104 joined thereto in view of air-tightness.

As described above, channels are partitioned by the partition walls (including bottom plates, top plates, side plates, and outer plates) in the supply and discharge part 2, the high-temperature reaction part 4, the low-temperature reaction part 6, and the connecting pipe 8, and, in any part, the thickness of the partition wall is set to 0.1 mm to 0.2 mm, and preferably to 0.1 mm.

That is, in the high-temperature reaction part 4, the partition wall 103 of the base plate 102, the partition wall 105 of the lower frame 104, and the partition wall 107 of the middle frame 106 overlap one another in the surface direction, and thereby, the zigzag side walls are formed. The reforming channel 116, the supply channel 114, and the discharge channel 115 are partitioned by the upper face of the bottom plate 113 of the base plate 102 and the lower face of the bottom plate 141 of the combustor plate 108 in addition to the side walls. Further, the combustion chamber 138 and the combustion chamber 140 are partitioned by the upper face of the bottom plate 141 of the combustor plate 108, the partition wall 109, and the lower face of the bottom plate 152 of the upper frame 110. Furthermore, the reforming channel 150 is partitioned by the upper face of the bottom plate 152 of the upper frame 110, the partition wall 111, and the lower face of the lid plate 112.

In the low-temperature reaction part 6, the partition wall 41 of the base plate 102, the partition wall 43 of the lower frame 30, and the partition wall 45 of the middle frame 32 overlap one another in the surface direction, and thereby, the zigzag side walls are formed. The respective channels are partitioned by the upper face of the bottom plate 53 of the base plate 28 and the bottom plate 86 of the upper frame 34 in addition to the side walls. Furthermore, the channel for removing carbon monoxide 84 is partitioned by the upper face of the bottom plate 86 of the upper frame 34, the partition wall 47, and the lower face of the lid plate 36.

Figure 14:
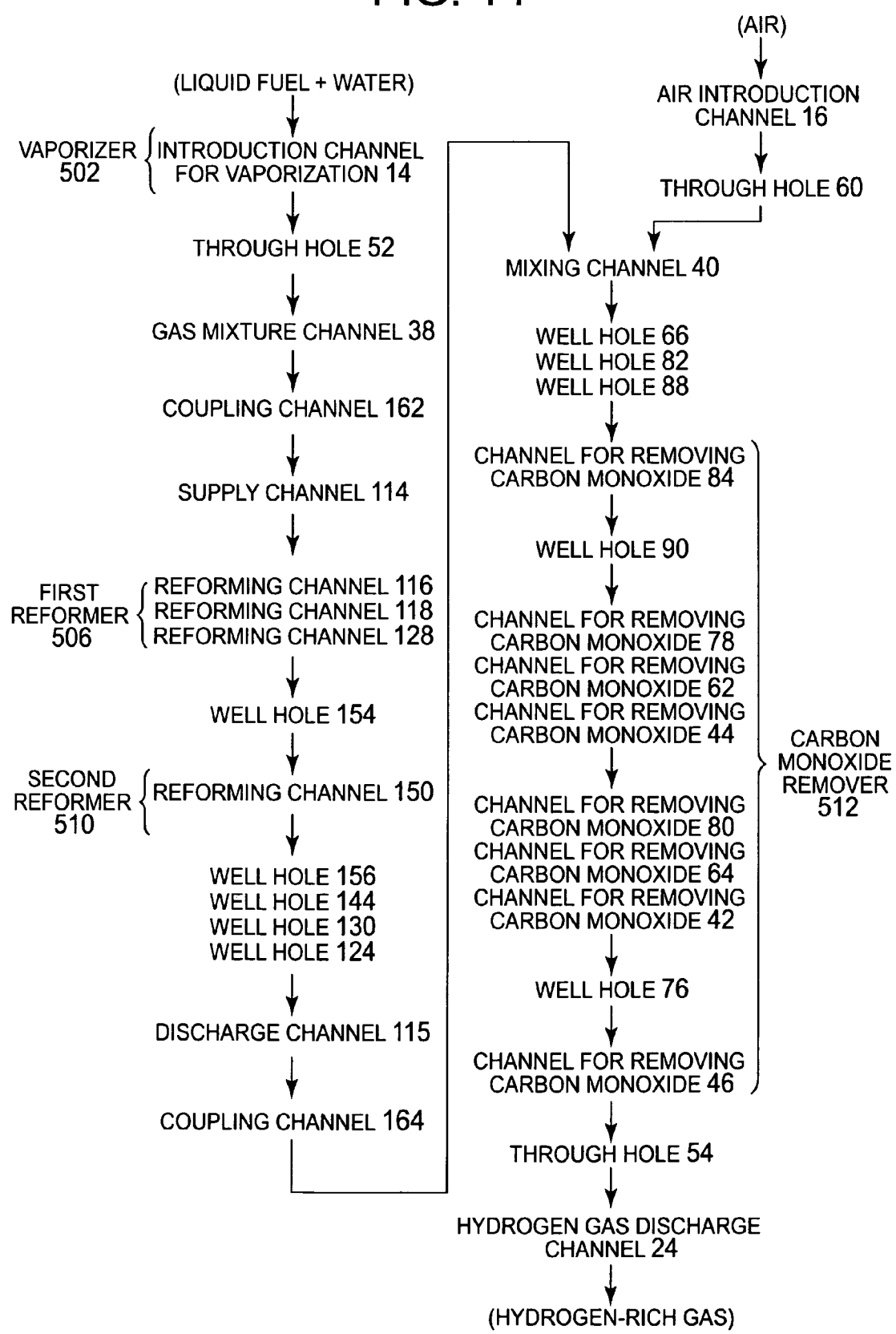
FIG. 14 shows a pathway from supply of a liquid fuel and water to discharge of hydrogen-rich gas as a product.
Figure 15:
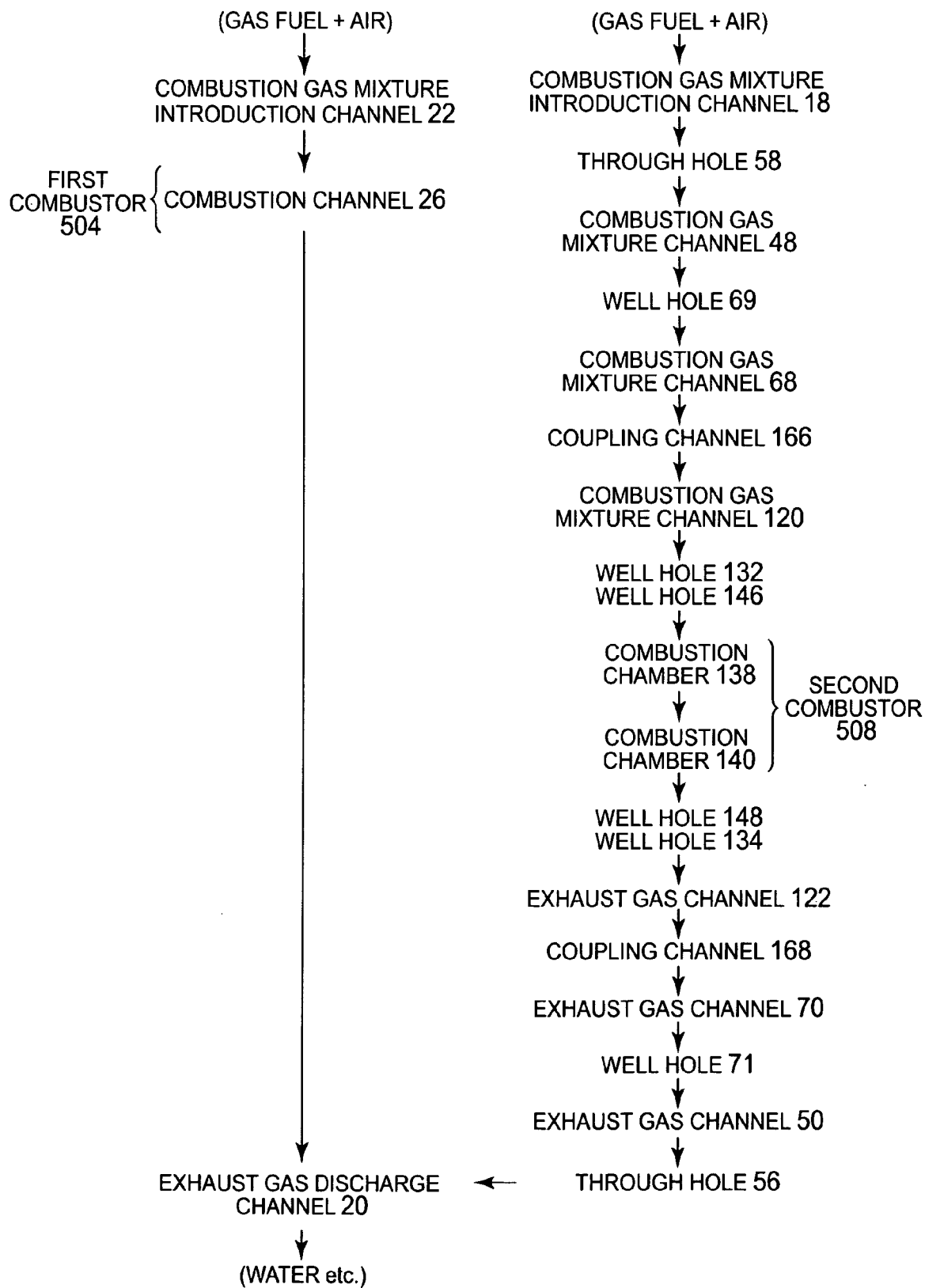
FIG. 15 shows a pathway from supply of combustion mixture to discharge of water and the like as products.

The pathways of the channels provided inside of the supply and discharge part 2, the high-temperature reaction part 4, the low-temperature reaction part 6, and the connecting pipe 8 are as shown in FIGS. 14 and 15. Here, the correspondence relationships between FIGS. 14 and 15 and FIG. 4 will be described. The introduction channel for vaporization 14 corresponds to the channel of the vaporizer 502, the reforming channels 116, 118, and 128 correspond to the channel of the first reformer 506, the reforming channel 150 corresponds to the channel of the second reformer 510, the part from the start point of the channel for removing carbon monoxide 84 to the end point of the channel for removing carbon monoxide 46 corresponds to the channel of the carbon monoxide remover 512, the combustion channel 26 corresponds to the channel of the first combustor 504, and the combustion chambers 138, 140 correspond to the combustion chamber of the second combustor 508.

As shown in FIGS. 2 and 5, an insulating film (not shown) of silicon nitride, silicon oxide, or the like is formed on the entire of the lower face of the low-temperature reaction part 6, i.e., the lower face of the base plate 28, the lower face of the high-temperature reaction part 4, i.e., the lower face of the base plate 102, and the lower face of the connecting pipe 8. A first heating element 170 is patterned on the lower face of the insulating film at the low-temperature reaction part 6 side in a zigzag condition so that it overlaps at least part of the channel of the carbon monoxide remover 512 in the plan view. A second heating element 172 is patterned on the lower face of the insulating film of the high-temperature reaction part 4 in a zigzag condition so that it overlaps at least part of the channel of the first reformer 506 and the second reformer 510 in the plan view. The wires 171 and 171 are formed from the low-temperature reaction part 6 to the connecting pipe 8, and are connected to both ends of the second heating element 172. An insulating film (not shown) of silicon nitride, silicon oxide, or the like is also formed on the side surface of the external circulation pipe 10 and the surfaces of the combustion plates 12, and a third heating element 174 is patterned from the lower face of the low-temperature reaction part 6 through the surfaces of the combustion plates 12 to the side surface of the external circulation pipe 10.

The first to third heating elements 170, 172 and 174 are resistance heating element which heats according to applied voltage. Because of the interposition of the insulating films, the short-circuit of the first to third heating elements 170, 172, 174 and the wire 171 to the connecting pipe 8, the base plate 28, the base plate 102, the external circulation pipe 10, the combustion plates 12 and the like can be prevented, and the heat generation efficiency of the first to third heating elements 170, 172, 174 can be improved.

The first to third heating elements 170, 172, 174 and the wire 171 are formed by stacking an adhesion layer, an anti-diffusion layer, and a heat generation layer in this order from the insulating film side. The heat generation layer is made of a material having the lowest resistivity among the three layers (e.g., Au). When voltages are applied to the first to third heating elements 170, 172, 174, current flows in a concentrated manner and heat is generated. The anti-diffusion layer is made of a material that makes the material of the heat generation layer hard to cause thermal diffusion to the anti-diffusion layer and the material of the anti-diffusion layer hard to cause thermal diffusion to the heat generation layer, and a material having relatively high melting point and low reactivity (e.g., W) is preferably used. The adhesion layer is a layer used when the anti-diffusion layer is low in adhesion to the insulating film and easily peeled, and made of a material superior in adhesion to both the anti-diffusion layer and the insulating film (e.g., Ta, Mo, Ti, Cr). The wires 171 and 171 may be formed integrally or separately with the second heating element 172. It is preferable that the wires 171 and 171 have resistance equal to or lower than those of the second heating element 172.

The first heating element 170 as a heating element for low-reaction part heats the low-temperature reaction part 6 at the activation, the second heating element 172 as a heating element for high-temperature reaction part heats the high-temperature reaction part 4 and the connecting pipe 8 at the activation, and the third heating element 174 heats the vaporizer 502 and the first combustor 504 of the supply and discharge part 2. Then, when the second combustor 508 is combusted with the offgas containing hydrogen from the fuel cell, the second heating element 172 heats the high-temperature reaction part 4 and the connecting pipe 8 as an aid to the second combustor 508. Similarly, when the first combustor 504 is combusted with the offgas containing hydrogen from the fuel cell, the first heating element 170 heats the low-temperature reaction part 6 as an aid to the first combustor 504.

Further, since the electric resistances of the first to third heating elements 170, 172, 174 change depending on temperature, they also function as temperature sensors that can read values of temperature from the resistance values to predetermined applied voltages. Specifically, the electric resistances of the first to third heating elements 170, 172, 174 are proportional to temperature. Since the first to third heating elements 170, 172, 174 also function as temperature sensors, temperature control can be performed without temperature sensors separately provided in the low-temperature reaction part 6, the high-temperature reaction part 4, and the connecting pipe 8, and the number of members and manufacturing cost can be suppressed. When the second heating element 172 is used as a temperature sensor, resistance of the wires 171 and 171 is also taken into account. Thus, it is preferable that the wire and second heating element 172 are made of same material.

A section made of a non-conducting material (insulating material) such as ceramic may be formed in a film form on the connecting pipe 8, the lower faces of the base plate 28 and the base plate 102, the side face of the external circulation pipe 10, and the surfaces of the combustion plates 12, and the first to third heating elements 170, 172, 174 and the wire 171 may be formed on the non-conducting material section. In this case, the mechanical strength of the connecting pipe 8, the low-temperature reaction part 6, the high-temperature reaction part 4, the multitublar material 10, and the combustion plates 12 increases and the breakage of these members can be prevented.

Each end of all the first to third heating elements 170, 172, 174 is located on the lower face of the base plate 28, and these ends are arranged so as to surround the combustion plates 12. First lead wires 176, 178 as lead wires for low-temperature reaction part are connected to both ends of the first heating element 170, respectively, second lead wires 180, 182 as lead wires for high-temperature reaction part are connected to ends of the wires 171 and 171, and third lead wires 184, 186 are connected to both ends of the third heating element 174, respectively. In FIG. 3, for better viewing of the drawing, illustration of the first to third heating elements 170, 172, 174 and the first to third lead wires 176, 178, 180, 182, 184, 186 is omitted.

Figure 16:
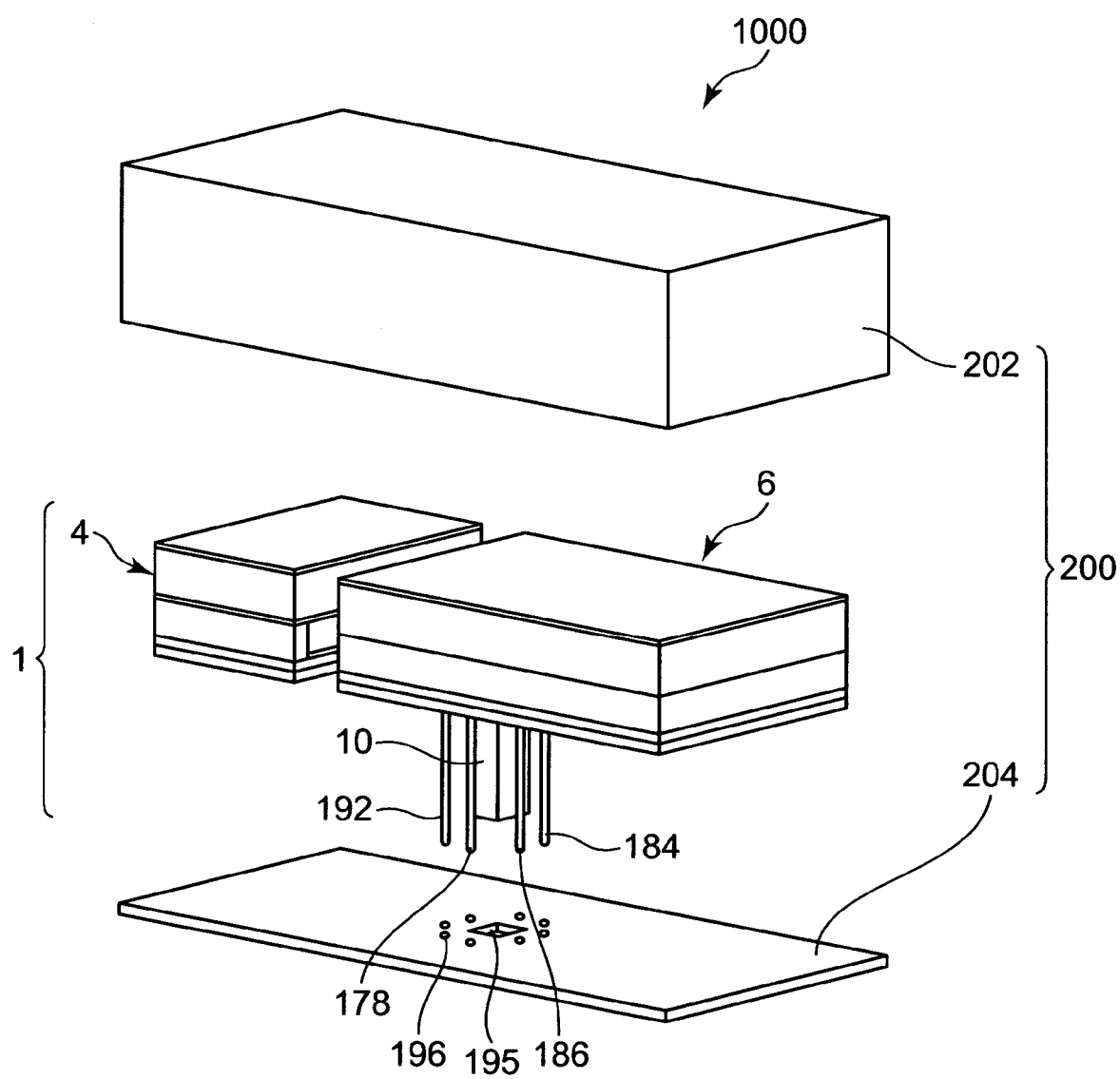
FIG. 16 is an exploded perspective view of a heat insulating package 200 of the microreactor module 1.
Figure 17:
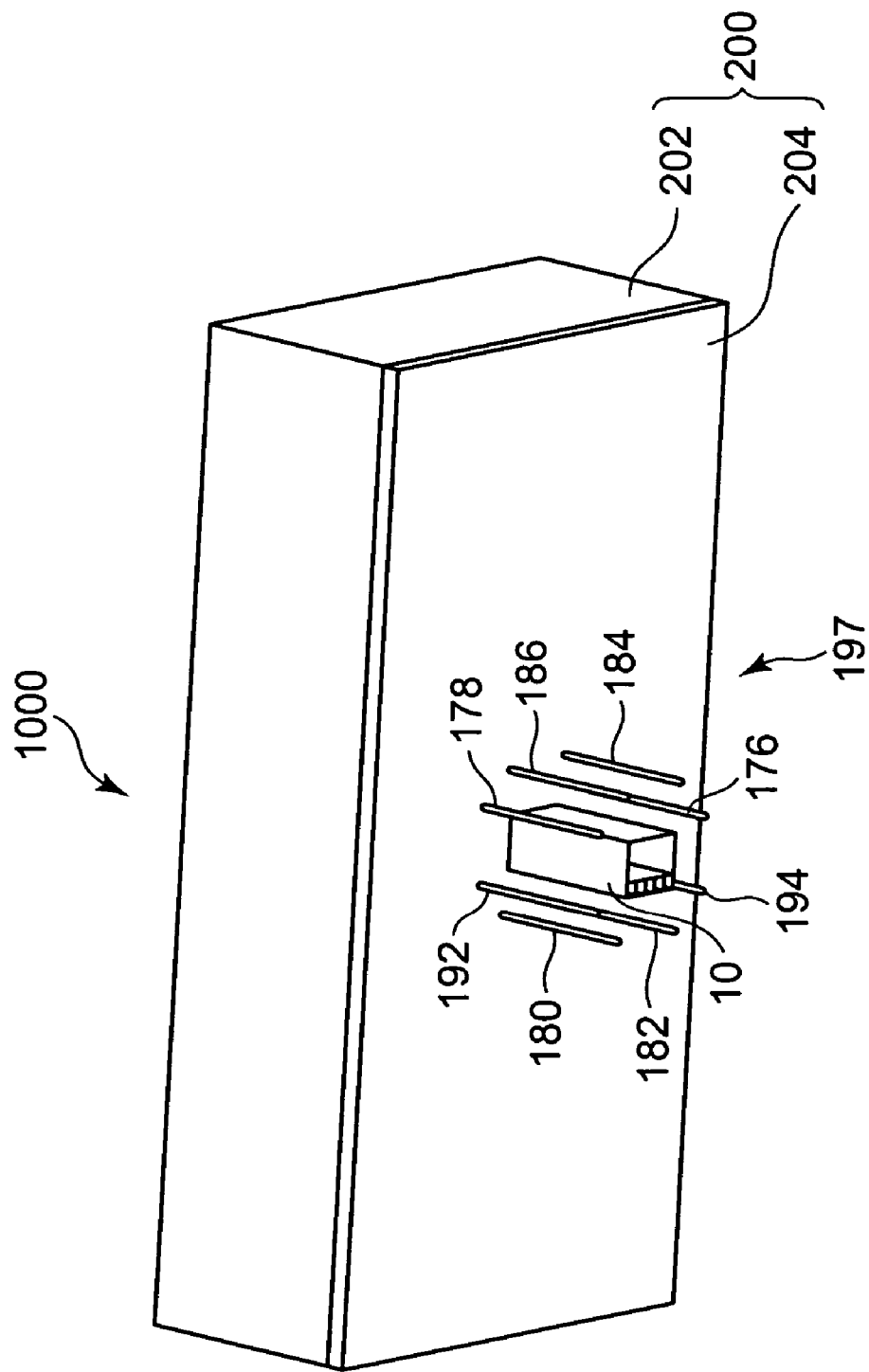
FIG. 17 is a perspective view of the heat insulating package 200 shown from diagonally below.

As shown in FIGS. 16 and 17, a reactor 1000 according to the invention includes a heat insulating package 200 in addition to the above microreactor module 1, and the high-temperature reaction part 4, the low-temperature reaction part 6 and the connecting pipe 8 are housed in the heat insulating package 200. The heat insulating package 200 includes a rectangular box 202 with a lower face opened, and a base plate 204 that closes the opening of the lower face of the box 202, and the base plate 204 is joined to the box 202 with a glass material or an insulating sealing material. Both the box 202 and the base plate 204 are made of a heat insulating material such as glass or ceramic, and metal reflection films of aluminum, gold, or the like are formed on the interior surfaces thereof. When such metal reflection films are formed, they reflect the radiation heat from the supply and discharge part 2, the high-temperature reaction part 4, the low-temperature reaction part 6, and the connecting pipe 8 and suppress the propagation to the outside of the heat insulating package 200. The inner space between the microreactor module 1 and the heat insulating package 200 is evacuated so that the internal pressure of the package may be 1 Pa or less. The external circulation pipe 10 of the supply and discharge part 2 is partly exposed from the heat insulating package 200, coupled to the fuel electrode of the power generation module 608, which will be described later, and further coupled to the fuel container 604 via the flow rate control unit 606.

The first to third lead wires 176, 178, 180, 182, 184, and 186 are partly exposed from the heat insulating package 200. The external circulation pipe 10 and the first to third lead wires 176, 178, 180, 182, 184, and 186 are joined to the base plate 204 of the heat insulating package 200 with a glass material or an insulating sealing material so that a gap such that external air enters the heat insulating package 200 from the parts in the external circulation pipe 10 and the first to third lead wires 176, 178, 180, 182, 184, and 186 exposed from the heat insulating package 200 and internal pressure increases may not be formed. Since the internal pressure of the inner space of the heat insulating package 200 can be maintained at a low level, the medium for propagating the heat generated by the microreactor module 1 becomes thin and the heat convection in the inner space is suppressed, and thereby, the heat retaining effect of the microreactor module 1 increases.

In the space sealed by the heat insulating package 200, the connecting pipe 8 intervenes between the high-temperature reaction part 4 and the low-temperature reaction part 6 at a predetermined distance. However, since the volume of the connecting pipe 8 is extremely smaller than the volumes of the high-temperature reaction part 4 and the low-temperature reaction part 6, the propagation of heat from the high-temperature reaction part 4 to the low-temperature reaction part 6 by the connecting pipe 8 is suppressed, the heat gradient required for reaction can be maintained between the high-temperature reaction part 4 and the low-temperature reaction part 6, and the temperature within the high-temperature reaction part 4 can be easily made uniform and the temperature within the low-temperature reaction part 6 can be easily made uniform.

As shown in FIGS. 3 and 5, on the surface of the low-temperature reaction part 6, a getter material 188 for absorbing factors that raise the pressure of the inner space of the heat insulating package 200 such as a fluid that can leak from the microreactor module 1 with time, a fluid generated from the microreactor module 1 with time, part of external air that remains because sufficient evacuation can not be performed at the joining of the box 202 and the base plate 204, and external air entering the heat insulating package 200 with time and removing the factors from the inner space of the heat insulating package 200 is provided. A heater of an electric heating material or the like is provided in the getter material 188, and a wire 190 is connected to the heater.

Both ends of the wire 190 are located on the lower face of the base plate 28 around the combustor plates 12, and fourth lead wires 192, 194 are connected to the both ends of the wire 190, respectively. The getter material 188 produces absorption action by being heated and activated, and an alloy principally consisting of zirconium, barium, or titanium is cited as a material of the getter material 188. In FIG. 3, for better viewing of the drawing, illustration of the lead wires 192, 194 is omitted.

The fourth lead wires 192, 194 are partly exposed from the heat insulating package 200, and the fourth lead wires 192, 194 are joined to the base plate 204 of the heat insulating package 200 with a glass material or an insulating sealing material so that a gap such that external air enters the heat insulating package 200 from the exposed parts and the internal pressure increases may not be formed. It is desired that a wiring group 197 having the first to fourth lead wires 176, 178, 180, 182, 184, 186, 192, and 194 is spaced so that the intervals of the respective lead wires may be uniform and provided around the external circulation pipe 10.

A through hole 195 through which the multitublar material 10 is inserted, and plural through holes 196 through which the first to fourth lead wires 176, 178, 180, 182, 184, 186, 192, and 194 are inserted, respectively, are provided in the base plate 204, and these through holes 195, 196 are insulated and sealed by a glass material or an insulating sealing material in a condition in which these multitublar material 10 and first to fourth lead wires 176, 178, 180, 182, 184, 186, 192, and 194 are inserted through the through holes 195, 196.

The connection sections to the first to third heating elements 170, 172, 174, wire 171 and the wire 190 in the wiring group 197 of the first to fourth lead wires 176, 178, 180, 182, 184, 186, 192, and 194 are collected on the low-temperature reaction part 6 so as to surround the combustor plates 12, and the first to fourth lead wires 176, 178, 180, 182, 184, 186, 192, and 194 are led out to the outside of the heat insulating package 200 from the collected sections through the base plate 204.

The external circulation pipe 10 projects to both inside and outside of the heat insulating package 200. Accordingly, the external circulation pipe 10 stands relative to the base plate 204 as a supporting column inside of the heat insulating package 200, and the high-temperature reaction part 4, the low-temperature reaction part 6, and the connecting pipe 8 are supported by the external circulation pipe 10 and the high-temperature reaction part 4, the low-temperature reaction part 6, and the connecting pipe 8 are spaced from the inner face of the heat insulating package 200.

Further, it is desirable that the external circulation pipe 10 is coupled to the lower face of the low-temperature reaction part 6 at the center of gravity of the entire of the high-temperature reaction part 4, the low-temperature reaction part 6, and the connecting pipe 8 in the plan view.

If the external circulation pipe 10 and the first to fourth lead wires 176, 178, 180, 182, 184, 186, 192, and 194 are provided in the high-temperature reaction part 4, because it is necessary to keep the high-temperature reaction part 4 at high temperature at the operation, also the temperature of the external circulation pipe 10 and the first to fourth lead wires 176, 178, 180, 182, 184, 186, 192, and 194 becomes high, and the amount of heat conducting and escaping from the external circulation pipe 10 and the first to fourth lead wires 176, 178, 180, 182, 184, 186, 192, and 194 to the heat insulating package 200 becomes larger. However, since the external circulation pipe 10 and the first to fourth lead wires 176, 178, 180, 182, 184, 186, 192, and 194 are provided in the low-temperature reaction part 6, the amount of heat conducting and escaping from the external circulation pipe 10 and the first to fourth lead wires 176, 178, 180, 182, 184, 186, 192, and 194 to the heat insulating package 200 is small and the amount of heat released from the parts exposed to the outside of the heat insulating package 200 in the external circulation pipe 10 and the first to fourth lead wires 176, 178, 180, 182, 184, 186, 192, and 194 is small, and the high-temperature reaction part 4 and the low-temperature reaction part 6 can be rapidly heated and the heating temperature can be easily and stably held.

Although the getter material 188 is provided on the surface of the low-temperature reaction part 6, the location where the getter material 188 is provided is not limited as long as it is inside of the heat insulating package 200.

Next, the operation of the reactor 1000 including the microreactor module 1 will be described.

First, when a voltage is applied between the fourth lead wires 192, 194, the getter material 188 is heated by the heater, and the getter material 188 is activated. Thereby, the factors that raise the pressure within the heat insulating package 200 are absorbed by the getter material 188, the degree of vacuum within the heat insulating package 200 becomes higher, and the heat insulation efficiency becomes higher.

Further, when a voltage is applied between the first lead wires 176, 178, the first heating element 170 generates heat and the low-temperature reaction part 6 is heated. When a voltage is applied between the second lead wires 180, 182, the second heating element 172 generates heat and the high-temperature reaction part 4 is heated. When a voltage is applied between the third lead wires 184, 186, the third heating element 174 generates heat and the supply and discharge part 2, mainly the upper part of the external circulation pipe 10 is heated. Since the supply and discharge part 2, the high-temperature reaction part 4, the low-temperature reaction part 6, and the connecting pipe 8 are made of metal materials, heat easily conducts among them. The temperature of the supply and discharge part 2, the high-temperature reaction part 4, and the low-temperature reaction part 6 is measured by measuring the potentials or current due to the respective voltage drops of the first to third heating elements 170, 172, and 174 as resistors having resistance values dependent on temperature by the control device. The measured temperature is fed back to the control device and the output voltages of the first to third heating elements 170, 172, and 174 are controlled so that the measured temperature may be within a desired temperature range by the control device, and thereby, the temperature control of the supply and discharge part 2, the high-temperature reaction part 4, and the low-temperature reaction part 6 is performed.

In a condition in which the supply and discharge part 2, the high-temperature reaction part 4, and the low-temperature reaction part 6 are heated by the first to third heating elements 170, 172, and 174, when the liquid mixture of the liquid fuel and water is continuously or intermittently supplied to the introduction channel for vaporization 14 by a pump or the like, the liquid mixture is absorbed by the liquid absorbing material 33 and the liquid mixture penetrates upwardly in the introduction channel for vaporization 14 because of a capillary phenomenon. Since the channel is filled with the liquid absorbing material 33 to the height of the combustor plates 12, the liquid mixture within the liquid absorbing material 33 is vaporized because of heat generation in the combustor plates 12, and the gas mixture of the fuel and water evaporates from the liquid absorbing material 33. The liquid absorbing material 33 is porous and therefore vaporizes the liquid mixture in chambers partitioned into a large number of minute space within. Accordingly, bumping that occurs in relatively large space can be suppressed and vaporization is stably performed.

Then, the gas mixture evaporated from the liquid absorbing material 33 passes through the through hole 52, the gas mixture channel 38, the coupling channel 162, and the supply channel 114, and flows into the first reformer 506 (the reforming channels 116, 118, and 128). Then, the gas mixture flows into the second reformer 510 (the reforming channel 150). While the gas mixture is flowing in the reforming channels 116, 118, 128, 150, the gas mixture is heated and reacts with catalysts, and thereby, a hydrogen gas and the like are generated (When the fuel is methanol, see the above reaction formulas (1), (2)).

The gas mixture (containing hydrogen gas, carbon dioxide gas, carbon monoxide gas and the like) generated in the first refiner 506 and the second refiner 510 passes through the well holes 156, 144, 130, 124, the discharge channel 115, and the coupling channel 164, and flows into the mixing channel 40. On the other hand, air is supplied by a pump or the like provided outside of the microreactor module 1 from the air introduction channel 16 to the through hole 60, flows into the mixing channel 40, and the gas mixture of hydrogen gas and the like and air are mixed.

Then, the gas mixture containing air, hydrogen gas, carbon monoxide gas, carbon dioxide gas and the like passes from the mixing channel 40 through the well holes 66, 82, 88 and flows into the carbon monoxide remover 512 (from the channel for removing carbon monoxide 84 to the channel for removing carbon monoxide 46). While the gas mixture is flowing from the channel for removing carbon monoxide 84 to the channel for removing carbon monoxide 46, the carbon monoxide gas in the gas mixture is selectively oxidized and the carbon monoxide gas is removed. Here, the carbon monoxide gas does not uniformly react from the channel for removing carbon monoxide 84 to the channel for removing carbon monoxide 46, but the reaction rate of carbon monoxide gas becomes higher at the downstream side (mainly from the channel for removing carbon monoxide 80 to the channel for removing carbon monoxide 46) of the pathway from the channel for removing carbon monoxide 84 to the channel for removing carbon monoxide 46. Since the oxidization reaction of carbon monoxide gas is a heat generation reaction, heat is generated mainly in the part from the channel for removing carbon monoxide 80 to the channel for removing carbon monoxide 46. Since the external circulation pipe 10 is located below the part, the heat caused by the oxidization reaction of carbon monoxide gas is efficiently used for the vaporization heat of water and fuel in the vaporizer 502 together with the heat of the first combustor 504.

Then, the gas mixture from which carbon monoxide has been removed is supplied to the fuel electrode and the like of the fuel cell through the through hole 54 and the hydrogen gas discharge channel 24. In the fuel cell, electricity is generated by the electrochemical reaction of the hydrogen gas from the hydrogen gas discharge channel 24, and the offgas containing unreacted hydrogen gas and the like is discharged from the fuel cell.

The above-described operation is an operation in the early stage, and the liquid mixture is continued to be supplied to the introduction channel for vaporization 14 during power generation. Then, air is mixed in the offgas discharged from the fuel cell, and the gas mixture (hereinafter, referred to as "combustion mixture") is supplied to the combustion mixture introduction channel 22 and the combustion mixture introduction channel 18. The combustion mixture supplied to the combustion mixture introduction channel 22 flows into the combustion channel 26 of the first combustor 504 and the combustion mixture burns. Thereby, the first combustor 504 surrounding the external circulation pipe 10 below the low-temperature reaction part 6 heats the external circulation pipe 10 and heats the low-temperature reaction part 6 to low temperature. Accordingly, power consumption of the first and third heating elements 170, 174 can be reduced and the use efficiency of energy becomes higher.

On the other hand, the combustion mixture supplied to the combustion mixture introduction channel 18 flows into the combustion chamber 138 and the combustion chamber 140 of the second combustor 508 and combustion mixture burns. Thereby, combustion heat is generated and heats the first reformer 506 under the second combustor 508 and the second reformer 510 on the second combustor 508 to high temperature. Heat can be efficiently propagated in the surface direction because the second combustor 508 is sandwiched by the first reformer 506 and the second reformer 510 from above and below and the heat loss is low because the part exposed to the space sealed by the heat insulating package 200 is small, and thereby, power consumption of the heating element 172 can be reduced and the use efficiency of energy becomes higher. Further, the safety can be improved because combustible hydrogen is not discharged with high concentration to the outside of the power generation unit including the microreactor module 1 and the fuel cell.

The liquid fuel stored in the fuel container may be vaporized and the combustion mixture of the vaporized fuel and air may be supplied to the combustion mixture introduction channels 18, 22.

In a condition in which the liquid mixture is supplied to the introduction channel for vaporization 14 and the combustion mixture is supplied to the combustion mixture introduction channels 18, 22, the control device controls the voltages applied to the first to third heating elements 170, 172, 174 while measuring the temperature by the resistance of the first to third heating elements 170, 172, 174 and controls the pump and the like When the pump is controlled by the control device, the flow of the combustion mixture supplied to the combustion mixture introduction channels 18, 22 is controlled, and thereby, the amounts of combustion heat of the combustors 504, 508 are controlled. Thus, the temperature control of the high-temperature reaction part 4, the low-temperature reaction part 6, and the supply and discharge part 2 is performed, respectively, by controlling the first to third heating elements 170, 172, 174 and the pump with the control device.

Here, the temperature control is performed so that the high-temperature reaction part 4 may reach 250° C. to 400° C., preferably 300° C. to 380° C., the low-temperature reaction part 6 may reach temperature lower than that of the high-temperature reaction part 4, specifically, 120° C. to 200° C., more preferably 140° C. to 180° C. More specifically, as shown in FIG. 13, a temperature distribution in which line L1 located near the bottom plate 53 of the low-temperature reaction part 6 is at 150° C., line L2 located at the upper end of the liquid absorbing material 33 is at 120° C., line L3 located on the outer surface of the base plate 204 is at 80° C., and line L4 located at the lower part of the liquid absorbing material 33 is at 65° C. is preferable.

That is, the external circulation pipe 10 and the wiring group 197 exposed from the heat insulating package 200 are provided not at the high-temperature reaction part 4 side, but at the low-temperature reaction part 6 side so that the temperature within the heat insulating package 200 may be held high and the amount of heat released to the outside of the heat insulating package 200 may be suppressed. Furthermore, the first combustor 504 is provided only around the upper part of the liquid absorbing material 33 so that the combustion heat of the first combustor 504 may propagate the external circulation pipe 10 and the temperature of the liquid absorbing material 33 within the introduction channel for vaporization 14 gradually raises from bottom to top for efficient vaporization of the fuel.

Further, the fuel absorbed by the liquid absorbing material 33 within the introduction channel for vaporization 14 and air introduced from the air introduction channel 16 have been heated before reaching the high-temperature reaction part 4 and the low-temperature reaction part 6, respectively, not only by the combustion heat of the first combustor 504 but also by the heat of the gas discharged from the exhaust gas discharge channel 20 and hydrogen gas discharge channel 24 in advance.

Similarly, the gas mixture introduced from the combustion mixture introduction channel 18 and the combustion mixture introduction channel 22, respectively, has been heated before reaching the second combustor 508 and the first combustor 504 by the heat of the gas discharged from the exhaust gas discharge channel 20 and hydrogen gas discharge channel 24 in advance.

Therefore, efficient heat exchange can be performed because, while the fluids of the introduction channel for vaporization 14, the air introduction channel 16, the combustion mixture introduction channel 18, and the combustion mixture introduction channel 22 are heated by the heat of the fluids of the exhaust gas discharge channel 20 and hydrogen gas discharge channel 24, the fluids of the exhaust gas discharge channel 20 and hydrogen gas discharge channel 24 are cooled by the fluids of the introduction channel for vaporization 14, the air introduction channel 16, the combustion mixture introduction channel 18, and the combustion mixture introduction channel 22.

Accordingly, a cooling unit for cooling the fluids of the exhaust gas discharge channel 20 and hydrogen gas discharge channel 24 may not be separately provided or the cooling unit may be downsized.

Figure 18:
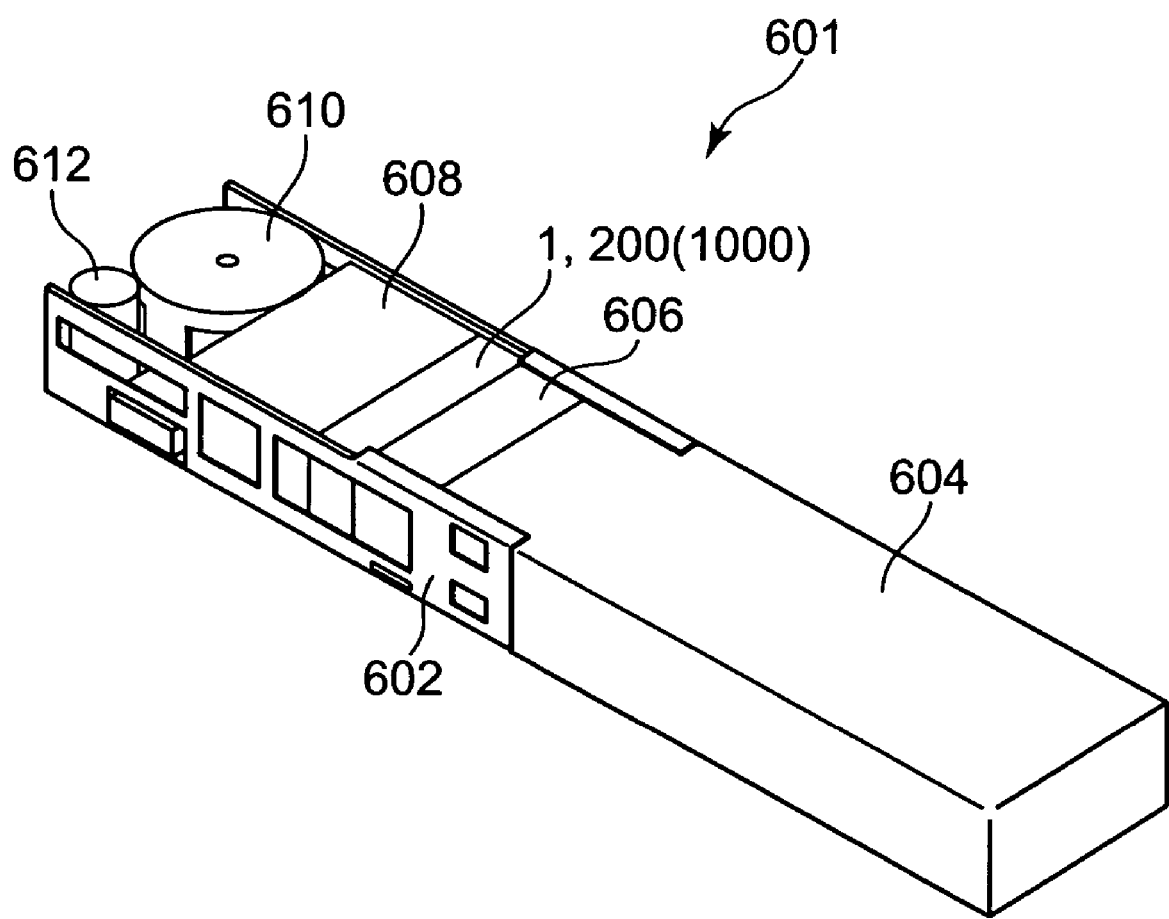
FIG. 18 is a perspective view of a power generation unit 601.

As shown in FIG. 18, the above described reactor 1000 can be used by being incorporated in a power generation unit 601. The power generation unit 601 includes a frame 602, a fuel container 604 detachable from the frame 602, a flow rate control unit 606 having a channel, pump, flow sensor, valve and the like, the microreactor module 1 housed in the heat insulating package 200 (reactor 1000), a power generation module 608 having a fuel cell, a humidifier for humidifying the fuel cell, a collector for collecting by-products generated in the fuel cell, an air pump 610 for supplying air (oxygen) to the microreactor module 1 and the power generation module 608, a power supply unit 612 having an external interface for electrically connecting a secondary cell, a DC-DC converter, and the power generation unit 601 to external equipment that is driven by the output of the power generation unit 601. Since the gas mixture of water and liquid fuel within the fuel container 604 is supplied to the microreactor module 1 by the flow rate control unit 606, a hydrogen-rich gas is generated as described above, the hydrogen-rich gas is supplied to the fuel electrode of the power generation module 608 as the fuel cell, and the generated electricity is stored in the secondary cell of the power supply unit 612.

Figure 19:
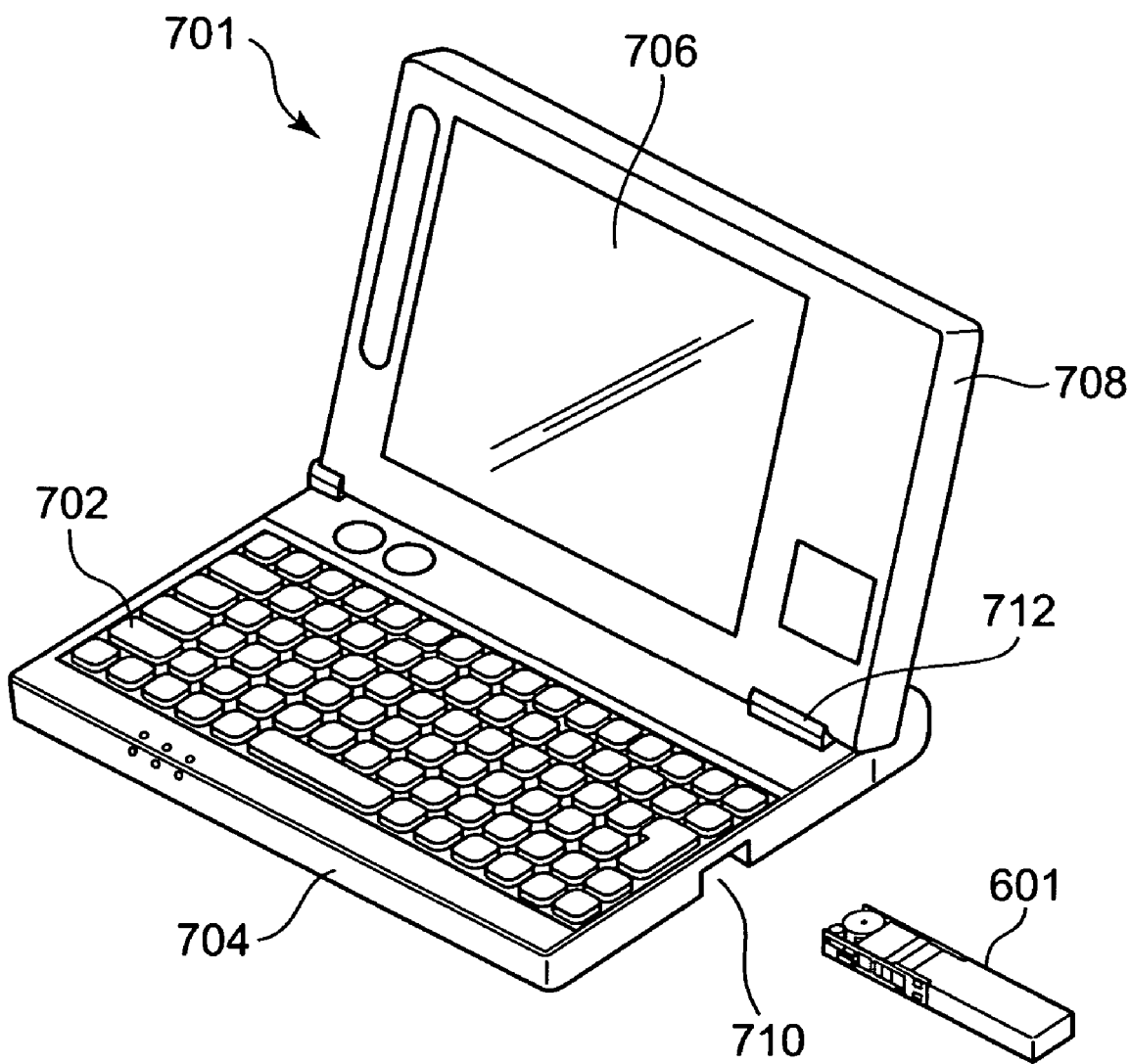
FIG. 19 is a perspective view of electronic equipment 701.

FIG. 19 is a perspective view of electronic equipment 701 using the power generation unit 601 as a power supply. As shown ion FIG. 19, the electronic equipment 701 is portable electronic equipment, particularly, a notebook personal computer. The electronic equipment 701 includes a lower casing 704 having an arithmetic processing circuit consisting of CPU, RAM, ROM, and other electronic parts built in and a keyboard 702 and an upper casing 708 having a liquid crystal display 706. The lower casing 704 and the upper casing 708 are coupled by a hinge part 712 and arranged so that the equipment can be folded with the upper casing 708 lapping over the lower casing 704 and the keyboard 702 opposed to the liquid crystal display 706. A mounting part 710 for mounting the power generation unit 601 is recessed from the right side face to the bottom face of the lower casing 704. When the power generation unit 601 is mounted on the mounting part 710, the electronic equipment 710 operates by the electricity of the power generation unit 601.

As described above, according to the embodiment, the wiring group 197 of the first to fourth lead wires 176, 178, 180, 182, 184, 186, 192, and 194 only that leads to the outside of the heat insulating package 200 is collected on the low-temperature reaction part 6 and penetrates the heat insulating package 200 from the collected part and is led out to the outside of the heat insulating package 200. That is, since the wires 171 and 171 are wired from the high-temperature reaction part 4 to the low temperature reaction part 6 and are connected to the second lead wires 180 and 182, the heat heated by the second heating element 172 in the high-temperature reaction part 4 is not directly propagated from the high-temperature reaction part 4 side to the outside of the heat insulating package 200, but once passing through the low-temperature reaction part 6 and propagated to the outside of the heat insulating package 200. Accordingly, the wiring group 197 including the second lead wires 180, 182 connected to the second heating element 172 is mainly at the temperature of the low-temperature reaction part 6. Therefore, even when the heat stored in the wiring group 197 leaks to the outside of the heat insulating package 200, the amount of heat becomes smaller than the amount of heat leaked outside by wiring when the wiring connected to the high-temperature reaction part 4 directly penetrates the heat insulating package 200 from the high-temperature reaction part 4 side.

Further, according to the embodiment, the inner space of the heat insulating package 200 is heat insulating space, the high-temperature reaction part 4 is spaced from the low-temperature reaction part 6, and the distance from the high-temperature reaction part 4 to the low-temperature reaction part 6 is the length of the connecting pipe 8. Therefore, the pathway of heat conduction from the high-temperature reaction part 4 to the low-temperature reaction part 6 is limited to the connecting pipe 8 and the heat conduction to the low-temperature reaction part 6 that does not require high temperature is restricted. Specifically, since the height and width of the connecting pipe 8 are smaller than the heights and widths of the high-temperature reaction part 4 and low-temperature reaction part 6, heat conduction through the connecting pipe 8 is minimized. Accordingly, heat loss of the high-temperature reaction part 4 can be suppressed and the temperature rise of the low-temperature reaction part 6 to higher temperature than the preset temperature can be suppressed. That is, even when the high-temperature reaction part 4 and the low-temperature reaction part 6 are housed within one heat insulating package 200, a temperature difference can be produced between the high-temperature reaction part 4 and the low-temperature reaction part 6.

Further, since the coupling channels 162, 164, 166, and 168 are provided in one connecting pipe 8, the stress generated in the connecting pipe 8 and the like can be reduced. That is, since there is a temperature difference between the high-temperature reaction part 4 and the low-temperature reaction part 6, the high-temperature reaction part 4 expands more than the low-temperature reaction part 6, but the stress generated in the connecting pipe 8 and the like can be suppressed because the high-temperature reaction part 4 has free ends except the coupling part to the connecting pipe 8. Specifically, since the height and width of the connecting pipe 8 are smaller than the heights and widths of the high-temperature reaction part 4 and the low-temperature reaction part 6, and further, the connecting pipe 8 is coupled to the high-temperature reaction part 4 and the low-temperature reaction part 6 at the centers in the width direction of the high-temperature reaction part 4 and the low-temperature reaction part 6, the generation of stress in the connecting pipe 8, the high-temperature reaction part 4, and the low-temperature reaction part 6 can be suppressed.

Since also the external circulation pipe 10 is coupled between the low-temperature reaction part 6 and the heat insulating package 200, the stress generated in the external circulation pipe 10 and the like can be reduced.

If the channels 162, 164, 166, and 168 are provided in separate coupling tube materials and the coupling tube materials are spaced and spanned between the high-temperature reaction part 4 and the low-temperature reaction part 6, stress is generated in these tube materials, the low-temperature reaction part 6, and the high-temperature reaction part 4 due to the displacement difference between the low-temperature reaction part 6 and the high-temperature reaction part 4. Further, since the temperature difference between the times of high temperature and low temperature in the high-temperature reaction part 4 is larger than the temperature difference between the times of high temperature and low temperature in the low-temperature reaction part 6, when the external circulation tube material is provided at the high-temperature reaction part 4 side, the thermal expansion and constriction of the tube material becomes larger than the thermal expansion and constriction of the tube material when the external circulation tube material is provided at the low-temperature reaction part 6 side, and therefore, the airtightness within the heat insulating package 200 is easily hindered. In the embodiment, generation of such stress is suppressed and airtightness can be held.

The external circulation pipe 10 and the first to fourth lead wires 176, 178, 180, 182, 184, 186, 192, and 194 extend to the outside of the heat insulating package 200, and all of these are coupled to the low-temperature reaction part 6. Accordingly, the direct heat generation from the high-temperature reaction part 4 to the outside of the heat insulating package 200 can be suppressed and the heat loss of the high-temperature reaction part 4 can be suppressed. Therefore, even when the high-temperature reaction part 4 and the low-temperature reaction part 6 are housed within one heat insulating package 200, a temperature difference can be produced between the high-temperature reaction part 4 and the low-temperature reaction part 6. Especially, since the introduction channel for vaporization 14, the air introduction channel 16, the combustion mixture introduction channel 18, the exhaust gas discharge channel 20, the combustion mixture introduction channel 22, and the hydrogen gas discharge channel 24 are collectively provided in one external circulation pipe 10, the area of the surface in which the pipe is exposed is suppressed, and the heat release from the pipe surface to the outside of the heat insulating package 200 can be suppressed, and the heat loss can be suppressed.

Since the lower face of the connecting pipe 8, the lower face of the high-temperature reaction part 4, and the lower face of the low-temperature reaction part 6 are in the same plane and there is no steps, the second heating element 172 and wires 171 and 171 can be patterned relatively easily, and disconnection of the second heating element 172 and wires 171 and 171 can be suppressed.

Further, since the introduction channel for vaporization 14 of the external circulation pipe 10 is filled with the liquid absorbing material 33 and the introduction channel for vaporization 14 is used as the vaporizer 502, the temperature condition required for vaporization of liquid mixture (a condition in which the upper part of the introduction channel for vaporization 14 is at 120° C.) can be provided while downsizing and simplification of the microreactor module 1 is realized.

Further, since the combustion plates 12 are provided around the external circulation pipe 10 at the upper end of the external circulation pipe 10, and further, the introduction channel for vaporization 14 is filled with the liquid absorbing material 33 to the height of the combustion plates 12, the combustion heat in the first combustor 504 can be efficiently used for vaporization of the liquid mixture.

Further, since the second combustor 508 is sandwiched between the first reformer 506 and the second reformer 510, the combustion heat of the second combustor 508 is evenly propagated to the first reformer 506 and the second reformer 510, and no temperature difference is produced between the first reformer 506 and the second reformer 510.

Since the partition walls that partitions the channels are made thin in any part of the supply and discharge part 2, the high-temperature reaction part 4, the low-temperature reaction part 6, and the connecting pipe 8, the heat capacity of these can be reduced and the supply and discharge part 2, the high-temperature reaction part 4, the low-temperature reaction part 6, and the connecting pipe 8 can be rapidly heated from the room temperature to high temperature in the early stage of the operation. Furthermore, the power consumption of the first to third heating elements 170, 172, 174 can be reduced.

What is claimed is:
1. A reactor comprising:
a high-temperature reaction part which causes reaction of a reactant;
a low-temperature reaction part which causes reaction of the reactant at a lower temperature than that of the high-temperature reaction part;
a connection section which connects the high-temperature reaction part and the low-temperature reaction part, and which is formed with a width narrower than a width of the high-temperature reaction part and a width of the low-temperature reaction part;
a high-temperature reaction part heating element which is provided in the high-temperature reaction part, and which heats the high-temperature reaction part;
a heat insulating package which houses the high-temperature reaction part, the connection section, and the low-temperature reaction part; and
a high-temperature reaction part lead wire which is electrically connected to the high-temperature reaction part heating element;
wherein the heat insulating package houses the high-temperature reaction part, the connection section and the low-temperature reaction part spaced apart from an inner face of the heat insulating package;
wherein the lead wire, whose first end side is connected to the high-temperature reaction part heating element, is wired to the low-temperature reaction part along the connection section and a second end side of the lead wire is positioned to penetrate through the heat insulating package from the low-temperature reaction part so as to be exposed to outside of the heat insulating package; and
wherein the lead wire applies a voltage to the high-temperature reaction part heating element from outside of the heat insulating package.

2. The reactor according to claim 1, wherein respective bottom faces of the high-temperature reaction part, the low-temperature reaction part and the connecting section are in a same plane.

3. The reactor according to claim 1, wherein an insulating film is formed on the high-temperature reaction part and the high-temperature reaction part heating element is provided on the insulating film.

4. The reactor according to claim 1, wherein the high-temperature reaction part heating element comprises a temperature sensor.

5. The reactor according to claim 1, further comprising:
a low-temperature reaction part heating element provided in the low-temperature reaction part; and
a low-temperature reaction part lead wire which is connected to the low-temperature reaction part heating element, and which applies a voltage to the low-temperature reaction part heating element from outside of the heat insulating package.

6. The reactor according to claim 1, further comprising:
a low-temperature reaction part heating element provided in the low-temperature reaction part; and
a low-temperature reaction part lead wire which is connected to the low-temperature reaction part heating element and exposed from the heat insulating package, and which applies a voltage to the low-temperature reaction part heating element from outside of the heat insulating package.

7. The reactor according to claim 6, wherein the the high-temperature reaction part lead wire and the low-temperature reaction part lead wire are provided in the low-temperature reaction part.

8. The reactor according to claim 1, wherein the low-temperature reaction part comprises a carbon monoxide remover.

9. The reactor according to claim 1, wherein the high-temperature reaction part comprises a reformer to reform a fuel containing hydrogen in a chemical composition of the fuel so as to generate hydrogen.

10. The reactor according to claim 1, wherein the low-temperature reaction part is mainly composed of a metal material.

11. The reactor according to claim 1, wherein the high-temperature reaction part is mainly composed of a metal material.

12. A fuel cell system comprising the reactor of claim 1.

13. An electronic equipment which operates by using the fuel cell system of claim 12.

* * * * *